(12) United States Patent
Broadfoot et al.

(10) Patent No.: US 8,370,798 B2
(45) Date of Patent: Feb. 5, 2013

(54) ANALYTICAL SOFTWARE DESIGN SYSTEM

(75) Inventors: Guy Hampson Broadfoot, Arendonk (BE); Philippa Jane Hopcroft, Harrow (GB)

(73) Assignee: Silverdata Limited (GB)

( * ) Notice: Subject to any disclaimer, the term of this patent is extended or adjusted under 35 U.S.C. 154(b) by 687 days.

(21) Appl. No.: 11/579,715

(22) PCT Filed: May 5, 2005

(86) PCT No.: PCT/GB2005/001704
§ 371 (c)(1),
(2), (4) Date: May 5, 2008

(87) PCT Pub. No.: WO2005/106649
PCT Pub. Date: Nov. 10, 2005

(65) Prior Publication Data
US 2008/0263506 A1      Oct. 23, 2008

(51) Int. Cl.
*G06F 9/44* (2006.01)
(52) U.S. Cl. .................. 717/107; 717/123; 717/126
(58) Field of Classification Search .......... 717/104–107, 717/123, 126
See application file for complete search history.

(56) References Cited

U.S. PATENT DOCUMENTS

| | | | |
|---|---|---|---|
| 5,615,137 A | 3/1997 | Holzmann et al. | |
| 6,532,401 B2 * | 3/2003 | Benson et al. | 700/245 |
| 6,532,554 B1 * | 3/2003 | Kakadia | 714/43 |
| 6,698,012 B1 * | 2/2004 | Kossatchev et al. | 717/126 |
| 7,543,274 B2 * | 6/2009 | Hinchey et al. | 717/123 |
| 2002/0100014 A1 * | 7/2002 | Iborra et al. | 717/104 |
| 2003/0033406 A1 * | 2/2003 | John et al. | 709/224 |
| 2004/0172638 A1 * | 9/2004 | Larus et al. | 719/328 |
| 2006/0178862 A1 * | 8/2006 | Chan et al. | 703/11 |

OTHER PUBLICATIONS

Hopcroft et al., "Combining the Box Structure Development Method and CSP for Software Development," 2005, Electronic Notes in Theoretical Computer Science, 128 (2005) 127-144, (www.sciencedirect.com).*
Clarke et al, "Model Checking", The MIT Press, XP002357163, 2000.
Broadfoot et al., "Academia and industry meet: some experiences of formal methods in practice", Proceedings of the Tenth Asia-Pacific Software Engineering Conference, pp. 48-59, XP002357160, 2003.
Broadfoot, "Using CPS to Support the Cleanroom Development Method for Software Development" University of Oxford—Master's Thesis. 'Online!, Sep. 2001, XP002357161.
Clarke et al., "Formal methods: state of the art and future directions", ACM Computing Surveys ACM USA, Vo. 28, No. 4, Dec. 1996, pp. 626-642, XP002358668.

(Continued)

*Primary Examiner* — Anna Deng
(74) *Attorney, Agent, or Firm* — Lerner, David, Littenberg, Krumholz & Mentlik, LLP

(57) ABSTRACT

An analytical software design system arranged to receive informal system design specifications and to convert them into verified design specifications for use in creating source code and carrying out implementation testing of the source code is described. The system comprises a verified black box specification generator arranged to process the received informal system design specifications to create formal specifications; to generate from the formal specifications mathematical models representing the system behavior; to analyze the mathematical models to determine if they have the required behavior; to adjust the formal specifications until the required behavior is achieved; and to derive the required verified design specifications from the mathematical models.

45 Claims, 34 Drawing Sheets

OTHER PUBLICATIONS

Formal Systems (Europe) Ltd., Failures-Divergence Refinement: FDR2 User Manual, 2003, See http://www.fsel.com.

Hoare, Communicating Sequential Processes, Jun. 21, 2004, Prentice Hall, 1985.

Mills, "Stepwise Refinement and Verification in Box-Structures Systems", Computer, vol. 21, No. 6, pp. 23-36, Jun. 1988.

Prowell et al., "Foundations of Sequence-Based Software Specification", IEEE Transitions on Software Engineering, vol. 29, No. 5, pp. 417-429, May 2003.

Prowell, "TML: a description language for Markov chain usage models", Information and Software Technology, vol. 42, No. 12, pp. 835-844, Sep. 2000.

Prowell, "JUMBL: A Tool for Model-Based Statistical Testing", Proceedings of the 36th Hawaii International Conference on System Sciences, (HICSS'03), 2003 IEEE.

Roscoe, "Model-Checking CSP", Oct. 5, 1995, parag. 1-22, reprinted with permission from "A Classical Mind: Essay in Honour of C.A.R. Hoare", pp. 353-378, Prentice-Hall 1994.

Rosco The Theory and Practice of Concurrency, Prentice Hall, 1998.

Mills, et al., Principals of Information System Analysis and Design, Academic Press, 1986.

Prowell et al., "Cleanroom Software Engineering—Technology and Process", Addison-Wesley, 1998.

* cited by examiner

| Number | Stimulus | Response | Equivalence | Requirements Tag |
|--------|----------|----------|-------------|------------------|
| $n_1$ | $s_1$ | $r_1$ | $n_5$ | $t_1$ |
| $n_2$ | $s_2$ | $r_2$ | $n_6$ | $t_2$ |

There is One Row for Every Stimulus s in S.

This is One Row in the Table and is Represented by the Triple $(s_1, r_1, q_1)$ in the Set $\text{Rows}_{BB}(C)$.

The Set $\text{Rows}_{BB}(C)$ for Canonical Sequence C is Captures the Information Above as Follows:
$\text{Rows}_{BB}(C) = \{ (s_1, r_1, n_5), (s_2, r_2, n_6) \}$

FIG. 14

| Number | Stimulus | Response | Equivalence | Requirements Tag |
|---|---|---|---|---|
| ... | $s_1$ | $r_1$ | $n_3$ | ... |
| ... | $s_2$ | $r_2$ | $n_4$ | ... |

ROW 1
ROW 2

The CSP Process $P_C$ Representing this Table is Defined as Follows:

$$P_C = \Box \{Q(s, r, n) \mid (s, r, n) \in \text{Rows}_{BB}(C)\}$$
$$= Q(s_1, r_1, n_3) \Box Q(s_2, r_2, n_4)$$

For Row 1, Q is Defined as: $Q(s_1, r_1, n_3) = s_1 \rightarrow r_1 \rightarrow P_{n_3}$ For Row 2, Q is Defined as: $Q(s_2, r_2, n_4) = s_2 \rightarrow r_2 \rightarrow P_{n_4}$ Therefore, $$P_C = (s_1 \rightarrow r_1 \rightarrow P_{n_3}) \Box (s_2 \rightarrow r_2 \rightarrow P_{n_2})$$

FIG. 15

| Current State | Response | State Update |
|---|---|---|
| $q_1$ | $r_1$ | $q_3$ |
| $q_2$ | $r_2$ | $q_4$ |

This is One Row in the Table and is Represented by the Triple $(q_1, r_1, q_3)$ in the Set $\text{Rows}_{SB}(s)$.

The Collective Set of Rows Must Cover All Possible States. Thus, for Stimulus s, One can Derive the Response and State Update in Any Given State of the System from this Table.

The Set $\text{Rows}_{SB}(s)$ for Stimulus s Captures the Information Above as Follows:
$\text{Rows}_{SB}(s) = \{ (q_1, r_1, q_3), (q_2, r_2, q_4) \}$

FIG. 16

| Channels /140 | Stimuli /150 | Responses /151 | Plot /152 |
|---|---|---|---|
| ISS | | | |
| ISSCB | | | |
| Queues /144 /145 | | | |
| DPCQ=DPCQin, DPCQout, 12 /143 /146 | | | |
| Bindings /147 | | | |
| Implemented Interface=Isubstage | | | |
| Stimuli with Fire and Forget Semantics. Out of Context Calls are Illegal on this Interface | | | |
| Initialise | ISS.IssInit+ | | |
| Stop | ISS.IssStop+ | | |
| Emergency Stop | ISS.IssEStop+ | | |

FIG. 18

| | |
|---|---|
| Stop Interpolation | ISS.IssStopInterpolation+ |
| Shutdown | ISS.IssShutdown+ |
| Enable Motion After Blocked Down-Transit to IDLE Down | ISS.IssResetBlockedReady+ |
| Enable Motion After Blocked Ready-Transit to READY | ISS.IssResetBlockedDown+ |
| Switch Controller Set | ISS.IssSwitchControlSet+ |
| Activate Movement on Signal Mode | ISS.IssStartMveOnSigOn+ |
| Deactivate Start Movement on Signal Mode | ISS.IssStartMveOnSigOff+ |
| Set Move Signal on | ISS.IssSetStartMoveSignal+ |
| Reset Start Move Signal | ISS.IssResetStartMoveSignal+ |
| Switch Measurement System and Control Set | ISS.IssSwitchMeasureSystemControlSet+ |
| Reset Callback Interface | ISS.IssResetSubStageCallback+ |
| Get Interface - Return Pointer to Substage Interface and Switch Callback to Client | ISS.IssGetInterface+ |

FIG. 18 (Cont.)

| Stimuli with Synchronous Return Values. Calls can "Fail" or be Out of Context. | | |
|---|---|---|
| Home | ISS.IssPrepHome | |
| Add Spline Entry | ISS.IssAddSplineEntry | |
| Start Relative PTP Movement | ISS.IssPrepMoveRelPtP | |
| Start Absolute PTP Movement | ISS.IssPrepMoveAbsPtP | |
| Start Jog Movement | ISS.IssStartJog | |
| Set PtP Parameters | ISS.IssSetPtpParams | |
| Start Scanning | ISS.IssPrepMoveScan | |
| Start Interpolation | ISS.IssPrepStartInterpolation | |
| SyncStop - Valid if Substage is in BUSY Moving but Start Signal not Set, or in BLOCKED Ready or BLOCKED Down (Unavoidable RACE). Illegal at All Other Times. | ISS.IssSyncStop | |
| Home IFM | ISS.IssHomeIFM | |

FIG. 18 (Cont.)

| Response - Asynchronous Notifications via Callback Queue | |
|---|---|
| Substage has Entered Idle Down State | ISSCB.IssOnStateDown |
| Substage has Entered Blocked Down Spontaneously | ISSCB.IssOnErrorBlockedDown |
| Spontaneous Stage Change to Ready or Solicited by "STOP" while Moving or ENABLE while BLOCKED READY or End of INIT | ISSCB.IssOnStateReady |
| Response to "ESTOP" Command when Substage Reaches Blocked Ready or if Substage is Already in Blocked Ready | ISSCB.IssOnStateBlockedReady |
| Spontaneous State Change to Blocked Ready in Response to Tracking Error etc. | ISSCB.IssOnErrorBlockedReady |
| Spontaneous Notification when Movement Starts to be Aborted Spontaneously Due to some Error e.g. Tracking Error | ISSCB.IssOnErrorAbortingMove |

FIG. 18 (Cont.)

| | |
|---|---|
| Notification that Scan Start Position has been Reached | ISSCB.IssOnScanStartPositionReached |
| Notification that Scan End Position has been Reached | ISSCB.IssOnScanEndPositionReached |
| Notification in Response to a Release | ISSCB.IssOnCallbackChanged |
| Synchronous Responses to Synchronous Stimuli with Synchronous Return Value | |
| Ok Retval for Synchronous Part of Function | ISS.IssOK |
| Failure of Synchronous Part of Function Call | ISS.IssFail |
| Call not Allowed in Current State | ISS.IssContext |
| Void Return for Responses without Return Value - Fire and Forget Semantics | |
| Void Return | ISS.NullRet |

FIG. 18 (Cont.)

| Abstract Responses for Modelling | | |
|---|---|---|
| Null Response | Null | |
| Response to "Illegal" Input Sequence | Illegal | |
| Response to a Stimulus that cannot Happen | Blocked | |
| Response to a Stimulus that cannot Happen | | |
| Used Interface - IMMAC | | |
| Abstractaction for IMMAC Call back Interface | | |
| Any MAC Event Possible in Context | IMCInt.MacEvent1 | IMCInt.MacEvent1 | Red |
| Any MAC Event Possible in Context | IMCInt.MacEvent2 | IMCInt.MacEvent2 | Red |
| Any MAC Event Possible in Context | IMCInt.MacEvent3 | IMCInt.MacEvent3 | Red |
| Any MAC Event Possible in Context | IMCInt.MacEvent4 | IMCInt.MacEvent4 | Red |
| Any MAC Event Possible in Context | IMCInt.MacEvent5 | IMCInt.MacEvent5 | Red |

FIG. 18 (Cont.)

| No | Stimulus | Predicate | Response | State Update | Equ | Comments | Tag |
|---|---|---|---|---|---|---|---|
| 0;<> | | | | | | ssHomed=false,<br>ssMoveType=ssNotMoving,<br>ssStartMoveSig=false,<br>ssStartOnMoveSig=false,<br>ssStopIntero=false,<br>ssEStopped=false,<br>ssStopped=false<br>ssSynchStopped=false,<br>ssPhase=ssNoPhase | IDLE<br>Down |
| 1 | ISS.IssInit+ | | ISS.NullRet | ssHomed=false,<br>ssMoveType=ssNotMoving,<br>ssStartMoveSig=false,<br>ssStartOnMoveSig=false,<br>ssStopIntero=false,<br>ssEStopped=false,<br>ssStopped=false<br>ssSynchStopped=false,<br>ssPhase=ssNoPhase | 1 | Start Initialising Substage;<br>Terminate Call Chain and Perform<br>Initialisation Asynchronously | TC-001 |
| 2 | ISS.IssPrepHome | | ISS.IssContext | | 0 | Client Error - Not Allowed in this Stage | TC-002 |
| 3 | ISS.IssPrepMoveRelPtP | | ISS.IssContext | | 0 | Client Error - Not Allowed in this Stage | TC-002 |
| 4 | ISS.IssPrepMoveAbsPtP | | ISS.IssContext | | 0 | Client Error - Not Allowed in this Stage | TC-002 |

FIG. 19

| | | | | |
|---|---|---|---|---|
| 5 | ISS.IssStartJog | ISS.IssContext | 0 | Client Error - Not Allowed in this Stage | TC-002 |
| 6 | ISS.IssSetPtPParams | ISS.IssContext | 0 | Client Error - Not Allowed in this Stage | TC-002 |
| 7 | ISS.IssPrepMoveScan | ISS.IssContext | 0 | Client Error - Not Allowed in this Stage | TC-002 |
| 8 | ISS.IssShutdown+ | ISS.NullRet; ISSCB.IssOnStateDown | 0 | Shutdown before Initialisation. Agree Immediately and Terminate Call Chain | DR-004 |
| 9 | ISS.IssPrepStartInterpolation | ISS.IssContext | 0 | Client Error - Not Allowed in this Stage | TC-002 |
| 10 | ISS.IssStopInterpolation+ | Illegal | - | Client Error - Not Allowed in this Stage | TC-002 |
| 11 | ISS.IssStop+ | Illegal | - | Client Error - Not Allowed in this Stage | TC-002 |
| 12 | ISS.IssSyncStop | Illegal | - | Client Error - Not Allowed in this Stage | TC-002 |
| 13 | ISS.IssEStop | Illegal | - | Client Error - Not Allowed in this Stage | TC-002 |
| 14 | ISS.IssResetBlockedReady+ | Illegal | - | Client Error - Not Allowed in this Stage | TC-002 |
| 15 | ISS.IssResetBlockedDown+ | ISS.NullRet | 0 | Request to Enter IDLE Down when Already IDLE Down. Obey Immediately | DR-005 |
| 16 | ISS.IssResetBlockedReady+ | Illegal | - | Client Error - Not Allowed in this Stage | TC-002 |
| 17 | ISS.IssStartMveOnSigOn+ | Illegal | - | Client Error - Not Allowed in this Stage | TC-002 |
| 18 | ISS.IssStartMveOnSigOff+ | Illegal | - | Client Error - Not Allowed in this Stage | TC-002 |
| 19 | ISS.IssAddSplineEntry | ISS.IssContext | 0 | Client Error - Not Allowed in this Stage | TC-002 |

FIG. 19 (Cont.)

| | | | | |
|---|---|---|---|---|
| 20 | ISS.IssSetStartMoveSignal+ | Illegal | - | Client Error - Not Allowed in this Stage | TC-002 |
| 21 | ISS.IssResetStartMoveSignal+ | Illegal | - | Client Error - Not Allowed in this Stage | TC-002 |
| 22 | ISS.IssSwitchMSControlSet+ | Illegal | - | Client Error - Not Allowed in this Stage | TC-002 |
| 23 | ISS.IssHomeIFM | ISS.IssContext | 0 | Client Error - Not Allowed in this Stage | TC-002 |
| 24 | ISS.IssGetInterface+ | ISS.NullRet | 0 | Client Requests Substage to Switch to his Callback Interface and Return Access to the Substage Interface and Report Current State | DR-003 |
| 25 | ISS.IssResetSubStageCallback+ | ISS.NullRet; ISSCB.IssOnCallbackChanged | 25 | Client Changes Callback Interface - Report State is Idle Down | DR-001 |
| 26 | IMCint.MacEvent1 | Blocked | + | Cannot Happen - Substage is Idle. This is Stable and Silent. | DR-002 |
| 1:<ISS.IssInit+> | | | | | BUSY Init |
| 27 | ISS.IssInit+ | Illegal | - | Client Error - Initialising | TC-017 |
| 28 | ISS.IssPrepHome | ISS.IssContext | 1 | Client Error - Initialising | TC-017 |
| 29 | ISS.IssPrepMoveRelPtP | ISS.IssContext | 1 | Client Error - Initialising | TC-017 |
| 30 | ISS.IssPrepMoveAbsPtP | ISS.IssContext | 1 | Client Error - Initialising | TC-017 |

FIG. 19 (Cont.)

| | | | | |
|---|---|---|---|---|
| 31 | ISS.IssStartJog | ISS.IssContext | 1 | Client Error - Initialising | TC-017 |
| 32 | ISS.IssSetPtpParams | ISS.IssContext | 1 | Client Error - Initialising | TC-017 |
| 33 | ISS.IssPrepMoveScan | ISS.IssContext | 1 | Client Error - Initialising | TC-017 |
| 34 | ISS.IssShutdown+ | ISS.NullRet | 34 | Shutdown During Initialisation; Start Shutdown and Terminate Call Chain | TC-008 |
| 35 | ISS.IssPrepStartInterpolation | ISS.IssContext | 1 | Client Error - Initialising | TC-017 |
| 36 | ISS.IssStopInterpolation+ | Illegal | - | Client Error - Initialising | TC-017 |
| 37 | ISS.IssStop+ | Illegal | - | Client Error - Initialising | TC-017 |
| 38 | ISS.IssSyncStop | Illegal | - | Client Error - Initialising | TC-017 |
| 39 | ISS.IssEStop+ | Illegal | - | Client Error - Initialising | TC-017 |
| 40 | ISS.IssResetBlockedReady+ | Illegal | - | Client Error - Initialising | TC-017 |
| 41 | ISS.IssResetBlockedDown+ | Illegal | - | Client Error - Initialising | TC-017 |
| 42 | ISS.IssSwitchControlSet+ | Illegal | - | Client Error - Initialising | TC-017 |
| 43 | ISS.IssStartMveOnSigOn+ | Illegal | - | Client Error - Initialising | TC-017 |
| 44 | ISS.IssStartMveOnSigOff+ | Illegal | - | Client Error - Initialising | TC-017 |
| 45 | ISS.IssAddSplineEntry | ISS.IssContext | 1 | Client Error - Initialising | TC-017 |
| 46 | ISS.SetStartMoveSignal+ | Illegal | - | Client Error - Initialising | TC-017 |

FIG. 19 (Cont.)

| | | | | |
|---|---|---|---|---|
| 47 | ISS.IssResetStartMoveSignal+ | Illegal | - | Client Error - Initialising | TC-017 |
| 48 | ISS.IssSwitchMSControlSet+ | Illegal | - | Client Error - Initialising | TC-017 |
| 49 | ISS.IssHomeIFM | ISS.IssContext | 1 | Client Error - Initialising | TC-017 |
| 50 | ISS.IssGetInterface+ | Illegal | - | Client Error - Initialising | TC-017 |
| 51 | ISS.IssResetSubStageCallback+ | ISS.NullRet; ISSCB.IssOnCallbackChanged | 51 | Client Changes Callback Interface - Report State is Idle Down or Ready | TC-007 |
| 52 | IMCint.MacEvent1 | ISSCB.IssOnStateReady | 52 | Substage is Fully Initialised and Reached Ready State without Errors. Notify Client. Ready State is Unstable and can Spontaneously Emit OnError BlockedDown or OnErrorBlockedReady Notifications. | TC-018 |
| 53 | IMCint.MacEvent2 | ISSCB.IssOnError BlockedDown | 53 | Substage Failed to Initialise and Reached Blocked Down State Due to Hard Error. Notify Client. | TC-019 |
| 54 | IMCint.MacEvent3 | ISSCB.IssOnError BlockedReady | 54 | Substage Failed to Initialise Completely Due to a Tracking Error During Initialisation. Tell Client Substage Reached Blocked Ready. | TC-019 |

FIG. 19 (Cont.)

| Tags | Derived Requirements |
|---|---|
| DR-001 | The Stimulus "ISS.IssResetSubStageCallback" is Allowed in IDLE State. Required Action is: Terminate Synchronous Call Chain and Generate a "ISSCB.IssOnCallbackChanged" Notification to the Client. |
| DR-002 | When the Substage is IDLE it is Also Down and the Control Loops are Open - There is no Dynamic Servo Actions and so There is no Possibility of a Spontaneous Tracking Error or Other Input from the Servo Interface. |
| DR-003 | Response to "ISS.IssGetInterface" Stimulus in IDLE State should be to Terminate the Client's Call Chain and Return the Requested Interface Pointer. |
| DR-004 | "ISS.IssShutdown" Stimulus Received in IDLE State could Indicate Shutdown Before Initialisation. However, Defined Response is to Terminate Client Call Chain and Generate a "ISSCB.IssOnStateDown" Notification. |
| DR-005 | When Requested to Enter IDLE While Already IDLE Just Respond with Normal Results. This has to be Allowed Due to Unavoidable Race Conditions. The Client cannot Always know when a Transition to IDLE Occurs. |
| DR-006 | |
| DR-007 | |
| DR-008 | |
| DR-009 | |
| DR-010 | |

FIG. 20

| | Canonical Sequence | State Name | Property 1 | Property 2 |
|---|---|---|---|---|
| 0 | 0:<> | IDLE Down | | |
| 1 | 1:<ISS.IssInit+> | Busy Init | | |
| 25 | 25:<ISS.IssResetSubStageCallback+> | BUSY RESETTING 1 | | |
| 34 | 34:<ISS.IssInit+, IISS.IssShutdown+> | BUSY Shutting Down | | |
| 51 | 51:<ISS.IssInit+, IISS.IssResetSubStageCallback+> | BUSY RESETTING 2 | | |
| 52 | 52:<ISS.IssInit+, IMCint.MacEvent1> | IDLE Ready | | |
| 53 | 53:<ISS.IssInit+, IMCint.MacEvent2> | BLOCKED Down | | |
| 54 | 54:<ISS.IssInit+, IMCint.MacEvent3> | BLOCKED Ready | | |
| 135 | 135:<ISS.IssInit+, IMCint.MacEvent1, ISS.IssPrepHome&ssStartOnMoveSig==false or ssStartMoveSig==true> | BUSY Homing | | |
| 138 | 138:<ISS.IssInit+, IMCint.MacEvent1, ISS.IssPrepMoveRelPtP> | BUSY Moving | | |
| 243 | 243:<ISS.IssInit+, IMCint.MacEvent1, ISS.IssPrepHome&ssStartOnMoveSig==false or ssStartMoveSig==true, ISS.IssEStop+> | ABORTING | | |
| 255 | 255:<ISS.IssInit+, IMCint.MacEvent1, ISS.IssPrepHome&ssStartOnMoveSig==false or ssStartMoveSig==true, ISS.IssResetSubStageCallback+> | BUSY RESETTING 3 | | |
| 271 | 271:<ISS.IssInit+, IMCint.MacEvent1, ISS.IssPrepMoveRelPtP, ISS.IssStop+ ssSynchStopped==false> | BUSY Stopping | | |

FIG. 21

ANALYTICAL SOFTWARE DESIGN SYSTEM

CROSS REFERENCE TO RELATED APPLICATIONS

The present application is a U.S. national stage entry under 35 U.S.C. §371 of International Application No. PCT/GB2005/001704, filed on May 5, 2005, published in English, which claims the priority from British Application No. 0410047.5, filed on May 5, 2004, the disclosures of which are incorporated herein by reference.

FIELD OF THE INVENTION

The present invention concerns an analytical software design system and more particularly though not exclusively a software design system which is arranged to improve the efficiency and effectiveness of software development within an industrial environment by applying mathematical techniques to specify, model and verify software designs before they are implemented.

BACKGROUND OF THE INVENTION

In virtually all recognised branches of engineering, implementations are based on verified designs; that is, the functional requirements of the end product are specified rigorously, mathematical models are constructed to represent these requirements and the proposed designs, and the design models are mathematically verified against the requirements models to ensure that they fulfil their intended function before implementation starts.

Software is not generally developed this way. The majority of software systems are specified by informal requirements specifications that are written in natural language in business and domain specific terms by domain experts who are generally not experts in software design and implementation. It is widely recognised that such specifications suffer from incompleteness, ambiguity and inconsistencies; in other words, a lack of rigour and precision.

Designs are made by experts in software design and implementation, but whose background domain knowledge is frequently shallow or incomplete. As a consequence, they will frequently not recognise the shortcomings of the specifications they are working from until well into the implementation of testing phase of a project, if at all.

The behaviour of event driven, embedded software is often extremely complex with much use being made of parallelism and the design must address many issues related to concurrency. Errors in such designs are common because it is extremely difficult to understand and reason about concurrent systems. If undetected, such design errors lead to implementation errors that are extremely difficult to detect and diagnose by testing because they tend to be intermittent in their effect and difficult to reproduce.

As a result, it is common for such software to be released with a large number of undiscovered defects and for these to remain undetected for months or even years.

It is helpful to define a number of terms that are used throughout this specification for describing the known prior art approaches and the embodiments of the present invention (also referred to as the ASD system) and these are set out below:

Industrial Software:
 Computer software developed primarily for commercial reasons. Such software is developed on a commercial basis and/or constitutes a product intended for commercial exploitation or constitutes a part of some other product itself developed on a commercial basis and/or intended for commercial exploitation.

Industrial software must meet the quality standards normally required and expected of commercial products in its market place. Industrial software usually needs to have a sustainable life of many years and be modifiable and maintainable by many different (teams of) software development experts during its life.

This is in contrast to software developed by academic, research or other organisations or individuals for non-commercial reasons such as advancing knowledge or for other reasons for which the primary motivation is not commercial.

Industrial Software Development:
 Any activity to develop Industrial Software. Industrial software development is carried out in a business context and subject to cost and time-to-market constraints. It frequently takes many man-years of effort to develop and comprises of thousands to millions of lines of source program code and the specifications and designs embody extensive product and domain specific knowledge. The scale and complexity of industrial software development puts it beyond the capabilities of single individuals and requires teams of software development experts working together with product and domain specialists.

Industrial Software Design:
 Design activities undertaken during industrial software development.

Black Box Specification:
 The specification of the externally visible behaviour of software component in terms of a total mathematical function that maps every possible sequence of input stimuli to the appropriate response. The exact form of this function and its specification is given in [PP03]. In the ASD System, two varieties of Black Box Function Specifications are used:
  1. An under-specified Black Box Function is used to specify component interfaces in a manner that captures the nondeterministic behaviour usually present on interface specifications because they are specified at a level of abstraction at which implementation details are hidden. In the ASD System, such specifications are also called Formal Interface Specifications.
  2. A fully specified Black Box is used to specify the design of a component. It is always intended that component designs are deterministic at the level of abstraction at which the designed behaviour is specified. In the ASD System, such specifications are also called Formal Component Design Specifications.

A Black Box Specification specifies behaviour in terms of sequences of input stimuli and responses. There is no state or control flow information included.

State Box Specification:
 A State Box Specification is a recasting of a Black Box Specification in the form of a total mathematical function that maps a pair (state, stimuli) to a pair (new state, response). The sequences of input stimuli are replaced by state data capturing the same information. In the ASD System, State Box Specifications, also called Implementation Specifications, are required only for those parts of the software for which the program source code cannot be generated automatically by the Code Generator and must therefore be programmed by hand. A State Box must specify exactly the same behaviour as the Black Box from which it is derived.

Functional Requirements:
 A set of statements specifying the required behaviour of a software component or system. Functional requirements are concerned only with behaviour; other required properties of the system or component are called non-functional requirements.

Functional Interface Specification:

An interface specification that describes the behaviour of a component in terms of its visible responses to sequences of input stimuli at one of its interfaces.

Requirements Specification:

A statement of requirements, functional and non-functional to be satisfied by the software system or component.

Architecture Specification:

A description of a software system that identifies its component parts, the interfaces between those components, the functions to be performed by each component and all other technical requirements and design rules with which all component designs and interface specifications must comply.

Component Specification and Design:

The detailed specification of a component, its organisation and structure and its detailed behaviour.

Component Test Cases:

Tests designed for testing specific individual components for correctness against the component specification and design. In the ASD System, these are typically generated automatically from the design by the Test Case Generator in the form of self executing test programs.

Source Program Code:

The implementation of the software in a programming language. This is not usually in a form that can be executed by a computer; it must first be translated to an executable form by special translators called compilers. A compiler is specific to the programming language being translated and the instruction set and architecture of the target computer processor.

Functional Design Specification:

A specification of a component design in terms of its behaviour.

Functional Correctness:

A design is said to be functionally correct if and only if the behaviour of the component complies with its Functional Requirements Specifications, the Functional Interface Specifications of the component interfaces it must implement and the component interfaces to other components that it uses.

It is also to be appreciated that the present specification references several academic papers and for the sake of convenience a fully referenced bibliography is provided at the end of the specific description.

Referring now to the block diagram of FIG. 1, there is shown a high-level summary of the essential phases of a conventional software development process 10 commonly used in industry. For the purposes of clarity, issues such as phases overlapping in practice and extending the description beyond the integration testing phase are ignored, as they are not relevant to the present invention. Additionally, all data/documents generated by any step are assumed to be carried through as input to all subsequent steps (for example, the informal requirements specification 14 is available to all five phases of the development process that follow the Requirements Analysis step 12). The steps taken for software development, as described in FIG. 1, are summarized as follows:

1. Requirements Analysis 12: Business analysts and domain experts develop Informal Requirements Specifications 14 describing, amongst other things, the required functional behaviour of the software system. This is written according to current practice and may use techniques such as UML diagrams, use cases, scenarios, sequence diagrams and flow charts together with natural language descriptions in an attempt to capture the essential behaviour as clearly as possible.

2. Specify and Design Architecture 16: Software design experts analyse the informal requirements 14 and partition the software system into components, identifying interfaces between them and allocating functional requirements to them. The result of this work is documented in an Informal Architecture Specification 18.

3. Specify and Design Components 20: For each component identified in the architecture 16, software design experts analyse the informal requirements and informal architecture specification and develop detailed specifications of the behaviour required of each component, their interfaces and a detailed design for implementing the required behaviour. The result of this work is a set of Informal Component Specifications and Designs documents 22.

4. Manually Implement Components 24: Software implementation experts write the Source Program Code 26 by hand, using all of the documents produced by the preceding steps. They also design and produce the detailed Component Test Cases 28 needed to test the programs, and detect and remove defects from them.

5. Component Testing 30: The source programs 26 implementing each component are tested individually and independently of each other using the component test cases 28 defined in the previous step. Depending on the nature of the components being implemented, the component testing 30 will be some mixture of automated test cases and manually executed test procedures. During this step, typically many errors are discovered in the program code. Some of these are implementation mistakes; others reflect errors made in earlier steps and are defects in the informal requirements, architecture and/or component designs and specifications. In FIG. 1, the consequences of this are depicted in the form of the Specification, Design and Implementation Defect Feedback Loops 32, 34. The resulting outputs of this step are Tested Components 36.

6. Integration Testing 38: In this step, the individually tested components 36 are integrated and tested to form the complete software system. During this step, a class of defects concerned with the interactions between the components are typically encountered for the first time. Due to issues such as concurrency, these are recognised as being among the most difficult to detect and solve. Some of these are implementation mistakes; others reflect errors made in earlier steps and are defects in the informal requirements, architecture and/or component designs and specifications. In FIG. 1, the consequences of this are depicted in the form of Specification, Design and Implementation Defect Feedback Loops 32, 34.

As shown in FIG. 1, all specifications and designs are described as "informal": they are not described in a rigorous notation based on mathematical principles. Consequently, (i) designs cannot be rigorously verified against their requirements specifications before implementation starts; and (ii) software developers rely on testing their implementation in order to detect errors in the original specifications and designs, as well as errors introduced during the implementation. FIG. 1 depicts this problem visually because the Specification and Design Defect Feedback Loops 32 connect all the phases of the software development process 10 together.

This way of carrying out conventional software design and its effects are illustrated graphically in FIGS. 2 and 3. FIG. 2 is a graph 50 showing how defects are commonly introduced throughout the software development process, but the majority of them are not detected and removed until testing starts late in the process. FIG. 3 is a graph 52, which depicts the consequences of the conventional approach on a typical project. As testing starts, defects are discovered and the amount of rework grows out of control.

As has been shown above there is a problem that errors in specifications and designs are not detected and removed before implementation and as a result, software testing must therefore detect and remove errors that originate in specification and designs, as well as errors of implementation. For software developed within industry, such a reliance on testing alone leads to unacceptable levels of defects remaining in the software. Some of the reasons for this, which have been appreciated by industry are summarized as follows:

1. Software testing can never be complete and cannot "prove" correctness; and
2. Industrial software is too complex to test exhaustively and therefore only a relatively small subset of total functionality can be tested.

Broadly speaking, two major approaches have been taken to seek to address these problems:

Process-based approaches, where disciplined work flows are established and supported by appropriate management practices in an attempt to reduce the defects injected during specification and design phase. This is achieved by social techniques such as document reviews, design walk-throughs, code inspections and so on;

Formal method-based approaches, where mathematical techniques are used to specify requirements and designs and perform some mathematically based correctness verification before implementation.

The informal, process-based approaches have generally come from the software development industry itself. Their major weakness is their steadfast refusal to recognise the need for mathematics for specifying and verifying software designs before implementation. These approaches, although valuable as form of disciplined engineering process, still rely on informal methods of specifying requirements and designs and provide no means for analysing the dynamic behaviour of the proposed designs before implementation. They also tend to lead to a concentration on the correctness of individual components rather than systems as a whole and do not address the most difficult design issues of concurrency in large systems.

The formal method-based approaches have largely been developed within academia and are mathematically based. Typically, required behaviour is specified using a rigorous mathematical notation and designs are evolved by a process called Stepwise Refinement in which designs and eventually implementations are produced in series of small, correctness preserving steps, rather similar in concept to the way mathematical proofs are presented.

In theory, the formal methods approach has held for a number of years now the promise of addressing the problems described in the previous section. There are numerous formal methods that have been developed over the last several decades, which have the necessary mathematical theory for modelling the designs of software systems and reasoning about their correctness. In practice, however, formal methods are hardly ever encountered in the industrial work place. Some of the reasons for this that have been appreciated by the present inventors are summarized as follows:

Lack of integration into software process: There is a communication gap between the formal methods experts on the one hand and the business analysts and domain experts on the other. There is little in the way of common shared knowledge between them. Business analysts and domain experts are not generally experts in any specific formal method and cannot participate in the process of developing formal specifications. The experts in formal methods generally are not experts in the domain of the system being specified and implemented and will not be familiar with the business case underlying the product; they must rely for on business analysts and domain experts for this knowledge. This communication gap raises the following question: if the business analysts and domain experts who have the product specific knowledge cannot understand the formal specifications and the formal methods experts who wrote and understand the formal specifications do not have a sufficiently deep understanding of the product domain to be sure that no mistakes have been made, how can the formal specifications be validated? Those who understand them don't know enough and those who know enough don't understand them. This gap must be overcome in order to integrate a formal approach into a software development process in industry. There must be feedback loops to and from every stage of the development process, including the clients and the domain experts.

Resistance within industry: Software developers and their management are not accustomed to applying mathematics to software development and many lack the necessary education and training to do so. There is strong resistance among software developers to a formal approach and the costs of doing so are perceived as prohibitive by management. Currently, industry is dedicated to an approach based on defect detection and removal and is attempting to address the current problems by becoming more efficient in testing. The use of formal methods requires an attitude shift away from this approach to one focused on defect prevention, a practice common in all other branches of engineering and this change is very difficult to achieve.

The immaturity of formal methods and tools: The formal methods techniques and tools are immature and are not able to cope with industrial scale software developments. These represent significant technical problems which have not been solved. They are also serious obstacles to progression because without tooling, all proof obligations must be carried out by hand. This is both error-prone and infeasible, given the scale of modern software systems being developed.

SUMMARY OF THE PRESENT INVENTION

An aim of the present invention is to at least substantially reduce the problems that have been described above and to provide a system for software development that when used to develop a software product results in less errors being present in that product, thereby shortening the development time and reducing the costs for generating industrial software which has been fully tested and is free from major defects.

According to one aspect of the present invention there is provided an analytical software design system arranged to receive informal system design specifications and to convert them into verified design specifications for use in creating source code and carrying out implementation testing of the source code, the system comprising: a verified black box specification generator arranged to process the received informal system design specifications to create formal specifications; to generate from the formal specifications mathematical models representing the system behaviour; to analyse the mathematical models to determine if they have the required behaviour; to adjust the formal specifications until the required behaviour is achieved; and to derive the required verified design specifications from the mathematical models.

The present invention addresses the prior art problems by providing a system in which specifications and designs are verified so that errors are removed before implementation starts. The derivation of required design specifications in this way enables separation of the two different types of testing which means that component and integration testing can concentrate on detecting and removing implementation errors alone which in turn reduces the cost of and the number of days required to carry out implementation testing. This is broadly achieved by the present invention by bridging the gap between existing industrial practice and the formal methods developed within academia so that these formal methods can be more widely applied.

In broad terms the technical advantages of the Analytical Software Design (ASD) system embodying the present invention are threefold:

1. Software development experts can use the ASD system to produce formal specifications and verified system designs that fully integrate into existing conventional software development processes. Fully integrated in this context implies that (i) there are continuous feedback loops into the development process for handling errors, extensions and modifications arising in practice, and (ii) the gap between the formal specifications and designs produced using ASD and the rest of the industrial development cycle is bridged. The consequence of this is that errors made during the Requirements Analysis, Architecture Specification and Design and Component Specification and Design phases are prevented from reaching the implementation phase and beyond. This is illustrated in FIG. 4 (described later) by the Specification and Design Defect Feedback Loop no longer extending to the Manually Implement Component, Component Testing and Integration Testing phases.
2. The ASD system preferably generates source program code automatically from the verified designs for parts of the system thereby reducing the amount of source program code that has to be produced manually. The advantage of this is a reduction in errors introduced during the implementation phase.
3. The ASD system preferably generates component test cases automatically from the verified component designs. This is also advantageous in that it increases both the effectiveness and coverage of component testing, resulting in fewer defects remaining when the software enters the Integration Testing phase.

FIGS. 5 and 6 describe graphically the resulting effect of extending the software development process with the ASD system upon error injection rates (see graph 54 of FIG. 5) and detection rates (see graph 56 of FIG. 6), and both of these graphs also draw a direct comparison with the conventional approach.

Further advantages of the present invention and features described in the accompanying description and claims are set out below.

The ASD System ensures that the implementation phase starts from verifiably correct designs and prevents design errors from reaching the implementation phase. This leads to the following benefits:

Testing only has to address implementation mistakes.

A significant reduction in avoidable rework; design errors are frequently the most expensive and problematic ones to fix.

A significant reduction in integration testing effort and time.

A significant reduction in the time to market.

A more predictable development time, cost and quality.

Traceable bridge: The sequence-based enumeration method provides full traceability between the formal models that are analysed and the informal requirements, stakeholders and members of the project. This provides the unity required in practice between specifications and the formal model being verified.

Automated generation of CSP models using the algorithms provided. This means that the benefits of using mathematical modelling based on CSP can be made available more easily because software design experts do not need the level of mathematical expertise necessary to make the models by hand. Also, because the models are generated automatically from designs and specifications, as these designs and specifications change there is no practical difficulty in keeping the mathematical models current; they are simply regenerated.

The CSP language was designed for the purposes of describing concurrent systems and therefore enables a rigorous analysis of concurrency issues arising during the design phase. Such issues are known to be among the most difficult problems to handle in software design and infeasible to solve in implementation phase. Before the provision of the ASD system disclosed in an embodiment of the present invention, there was a significant prejudice against the use of formal methods such as CSP in industry, as is was perceived to be too complicated and commercially unacceptable to use. This is because most software design experts do not have the specialised mathematical knowledge required to construct meaningful models in CSP. Also, the construction and maintenance of such models by hand is very expensive. The ASD system makes it possible for the benefits of CSP to be realised much more widely and results in fewer design errors reaching implementation.

The ASD System provides fully automated verification of functional behaviour of specifications and designs using the FDR model checker. As well as system requirements, this includes verifying the designs for properties such as accidental nondeterminism, safety and liveness, deadlock freedom and divergence freedom.

It is widely recognised within the software industry that software reuse offers the potential for significantly reducing software development time and cost and significantly reducing the number of errors still present in the software when it is released to its end users. A major impediment to a wider adoption of software reuse is the difficulty of specifying the behaviour of complex components with sufficient precision. The Formal Components Interface Specifications produced by the ASD System are both rigorously precise and understandable. In addition, they can be converted automatically into the mathematical models needed to verify the design of software using such reusable components. The ASD System therefore facilitates software re-use.

A Software system must be extended and maintained throughout its life. In a conventional software development environment, this is an expensive and error prone activity because much important design information is not written down and relies on the personal accumulated knowledge of the individuals who design and programmed the software. The ASD System improves this situation because it produces a complete set of verified specifications and designs. Planned changes can be made to these verified specifications and designs and re-verified using the ASD System before changing the implementation, resulting in improved quality and reduced cost.

Certification of software designs.

Can be used on systems of any size due to compositionality of CSP.

Generating code means fewer errors.

Automatic verification of state box against black box means fewer errors.

Automatic verification of state box against state box means that optimizations can be done at state box level and verified; this cannot be done at code level.

According to another aspect of the present invention, there is provided a method of carrying out analytical software design by receiving informal system design specifications and converting them into verified design specifications for use in creating source code and carrying out implementation testing of the source code, the method comprising: processing the received informal system design specifications to create formal specifications; generating from the formal specifications mathematical models representing the system behaviour; analysing the mathematical models to determine if they have the required behaviour; adjusting the formal specifications until the required behaviour is achieved; and deriving the required verified design specifications from the mathematical models.

BRIEF DESCRIPTION OF THE ACCOMPANYING DRAWINGS

Methods and apparatus according to preferred embodiments of the present invention for analytically designing and testing software will now be described by way of example, with reference to the accompanying drawings in which:

FIG. 14 is a table for illustrating an example of an enumeration table for some canonical sequence C;

FIG. 15 is a table for illustrating an example of the application of Algorithm 1 to an enumeration table for some canonical sequence C and generating the corresponding CSP process $P_C$;

FIG. 16 is a table illustrating an example of a state box for some stimulus s;

FIG. 18 is a schematic representation of an interface screen generated by an ASD Editor module of the ASD system shown in FIG. 7;

FIG. 19 is a schematic representation of an Sequence Enumeration Screen generated by the ASD Editor module of the ASD system shown in FIG. 7;

FIG. 20 is a schematic representation of a Derived Requirements Screen generated by the ASD Editor module of the ASD system shown in FIG. 7;

FIG. 21 is a schematic representation of an Canonical Analysis Screen generated by the ASD Editor module of the ASD system shown in FIG. 7;

Figure 23:
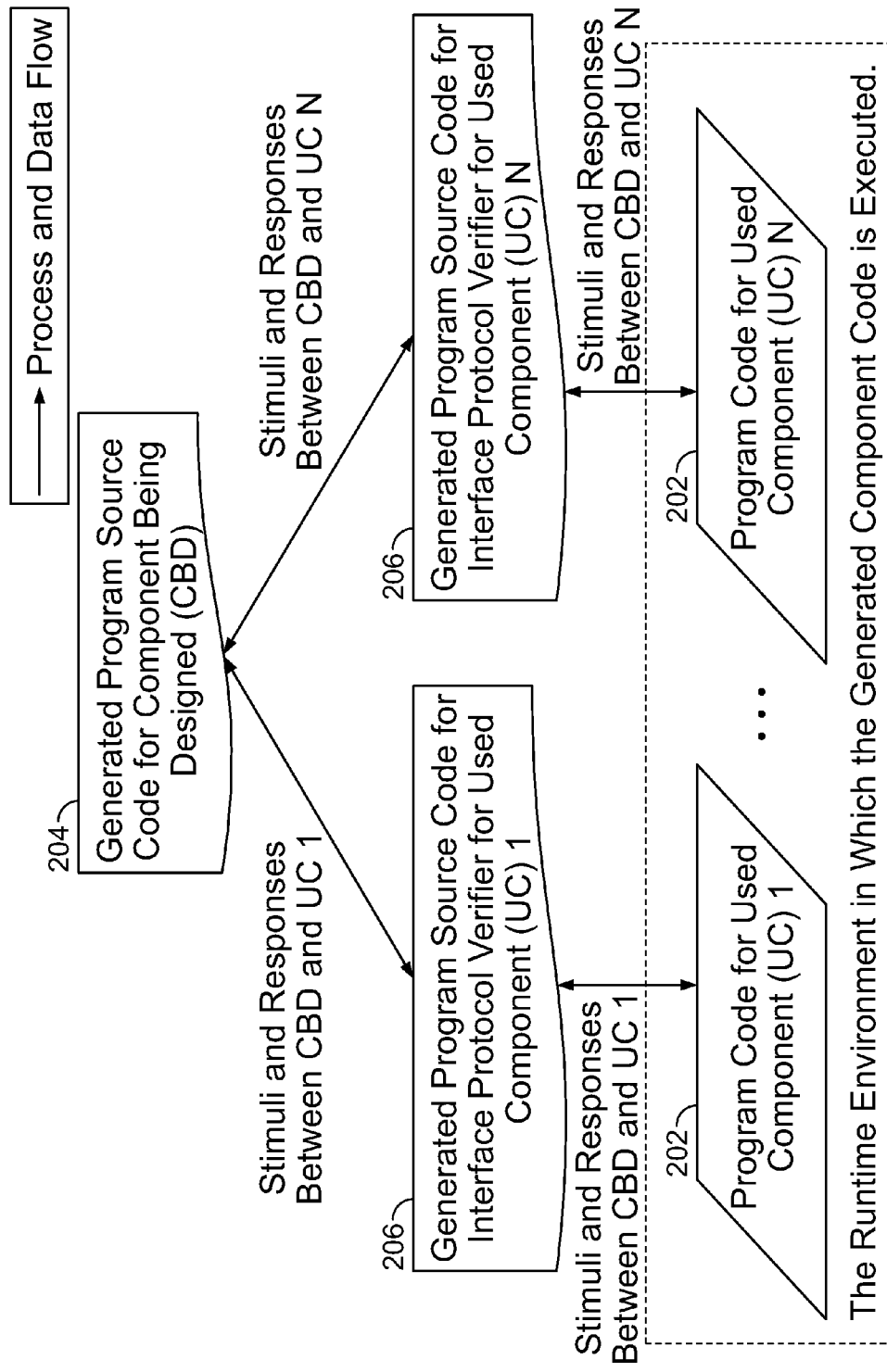
Figure 24:
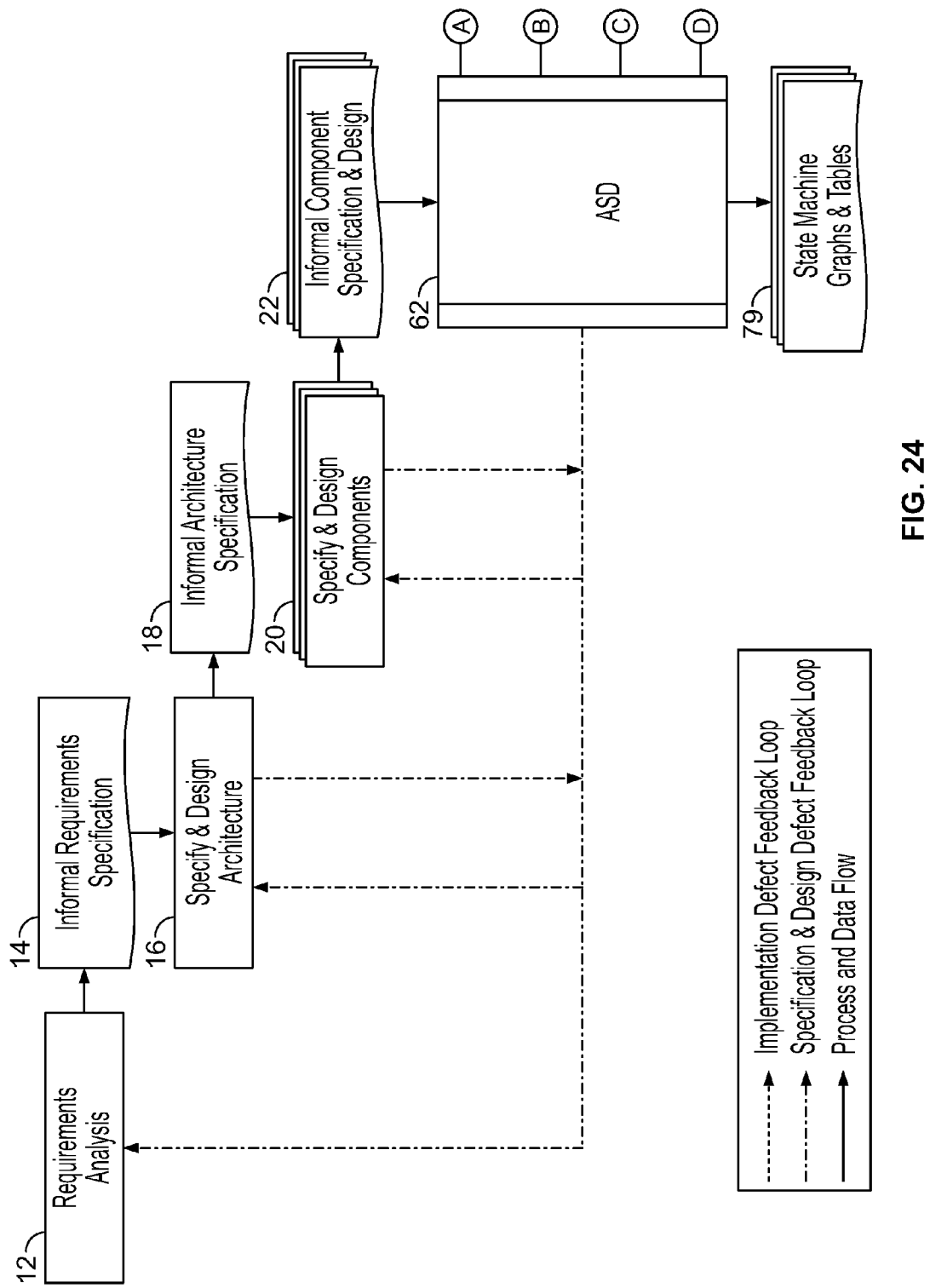
Figure 24:
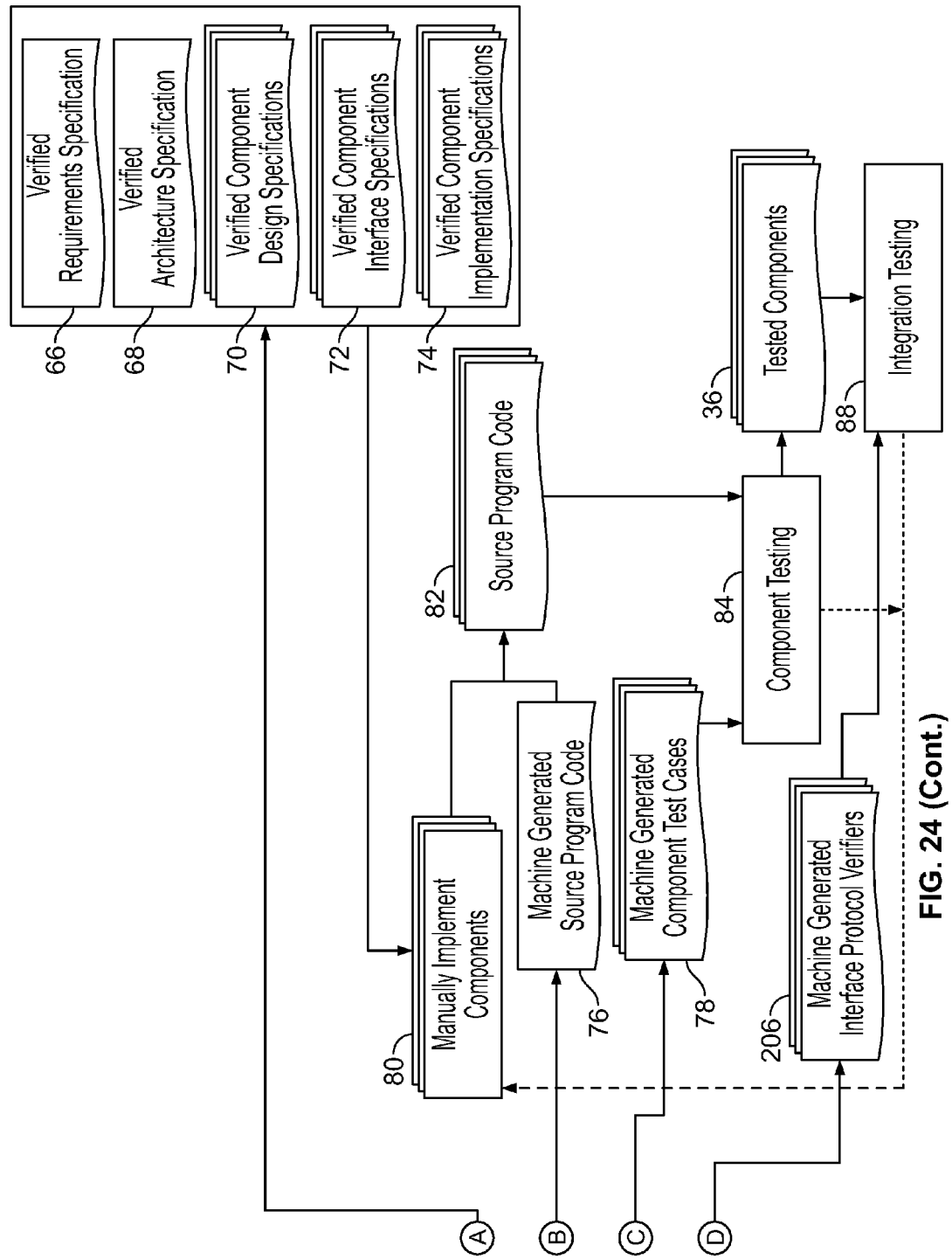
Figure 25:
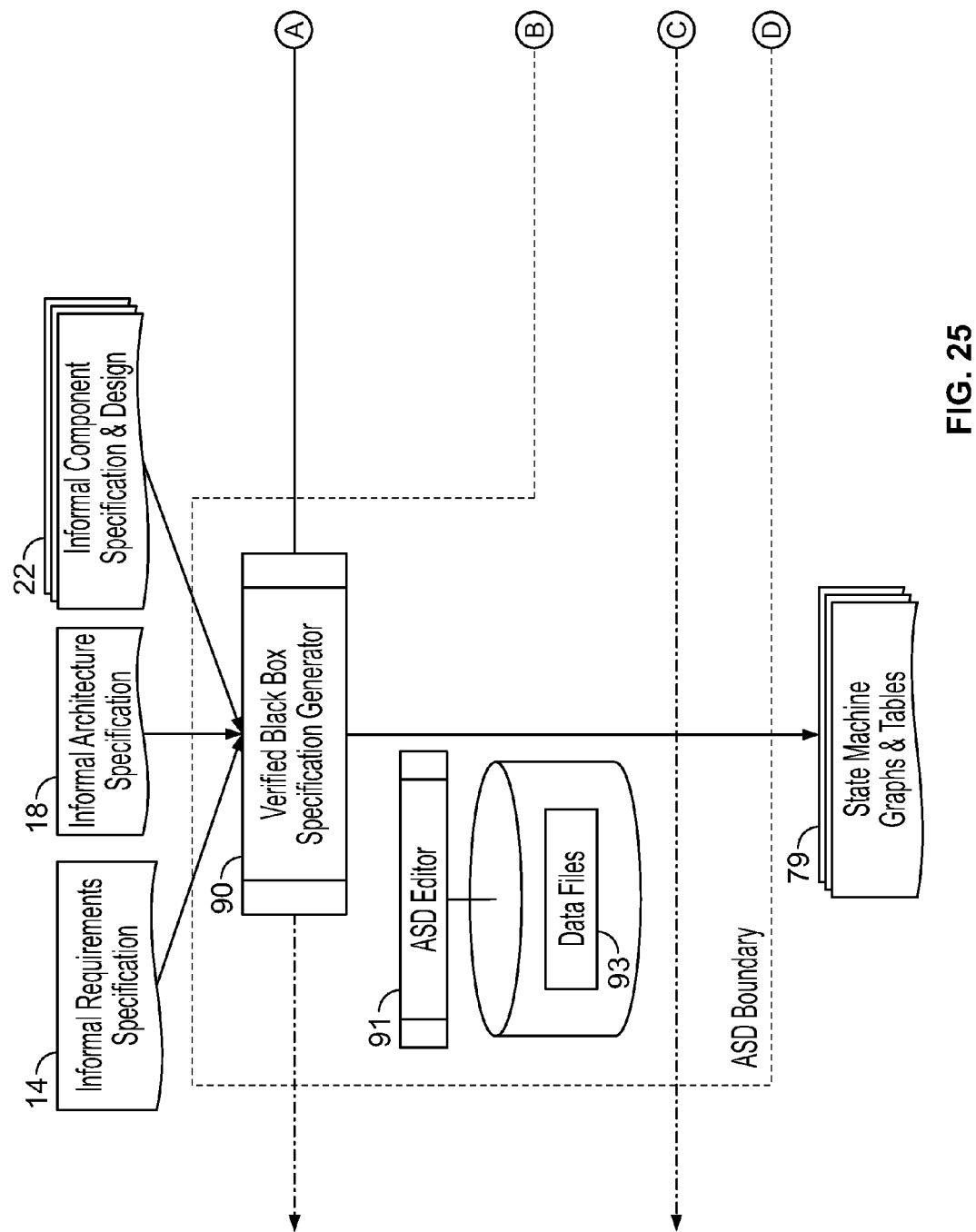
Figure 25:
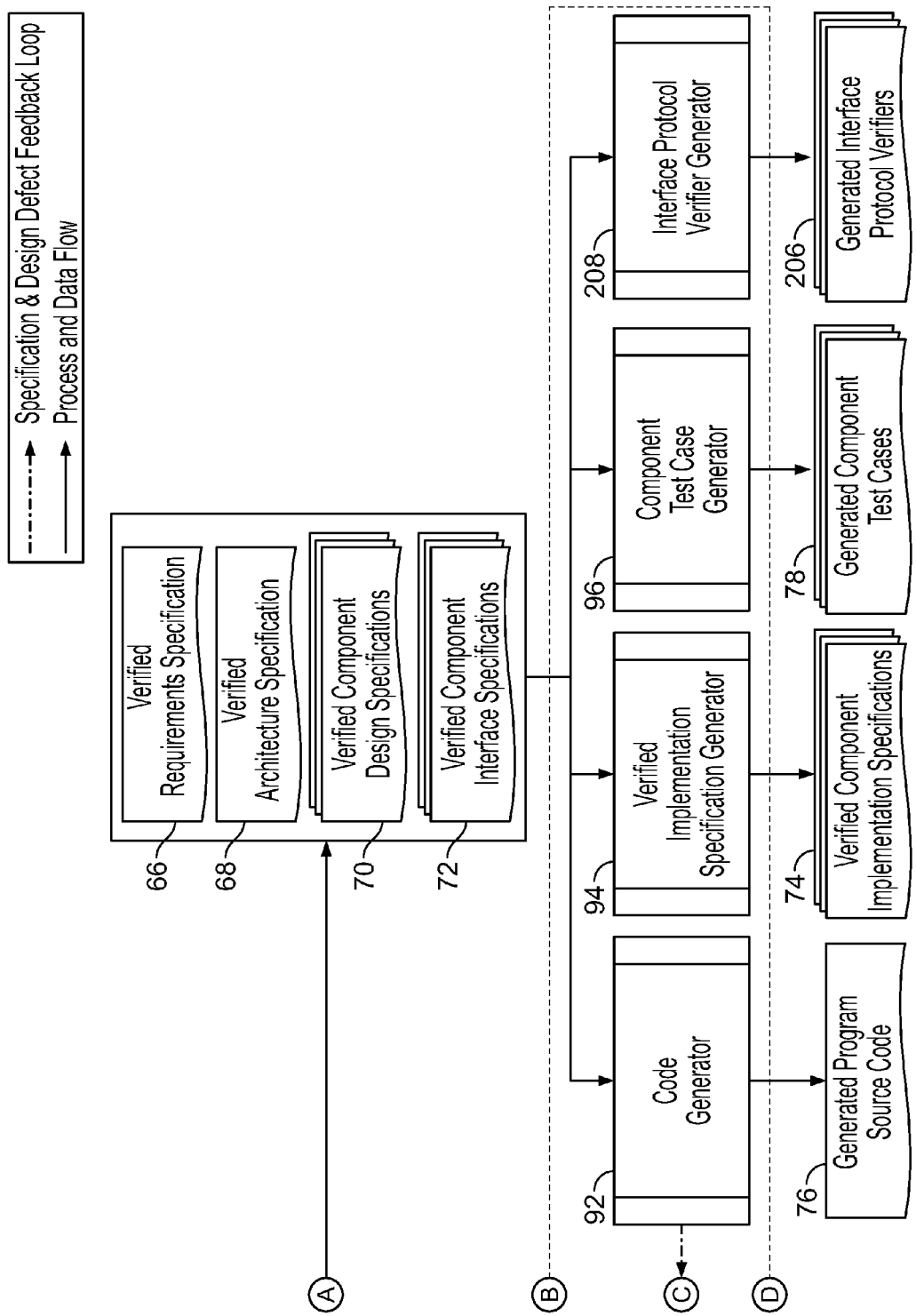

FIG. 23 a schematic block diagram illustrating the process of executing generated source code for a Component Being Designed (CBD) within its runtime environment together with the interface protocol verifiers for each of the components with which it interacts in accordance with a second embodiment of the present invention;

FIG. 24 is a schematic block diagram showing a modified software development process and system, including an integrated ASD system and interface protocol verifiers, according to the second embodiment of the present invention as shown in FIG. 23; and FIG. 25 is a schematic overview block diagram of the ASD system of the second embodiment of FIG. 24, showing a Verified Black Box Specification Generator, a Verified Implementation Specification Generator and an Interface Protocol Verifier Generator.

DETAILED DESCRIPTION OF THE PREFERRED EMBODIMENTS OF THE PRESENT INVENTION

Figure 1:
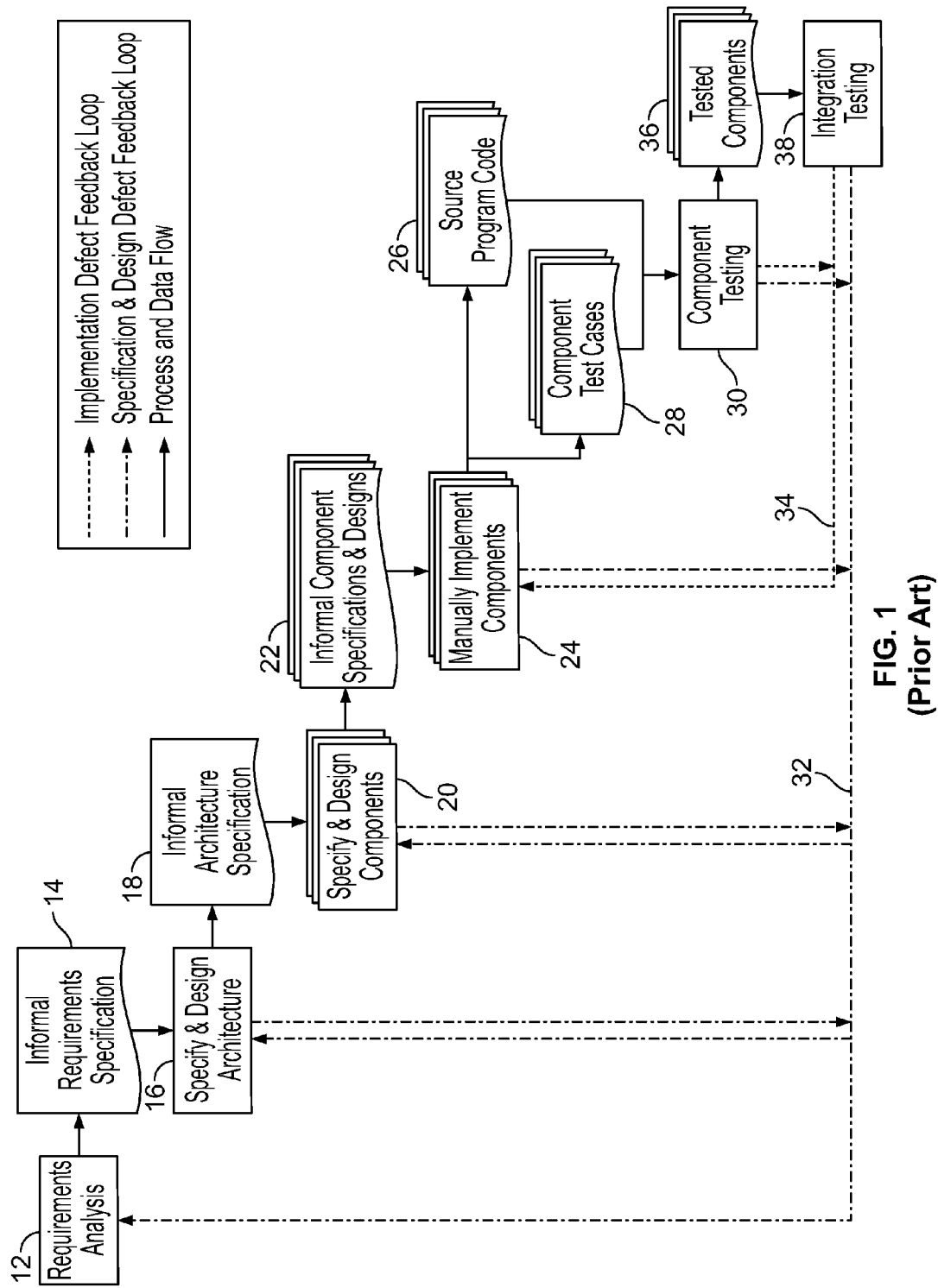
FIG. 1 is a schematic block diagram showing a conventional software development process.
Figure 2:
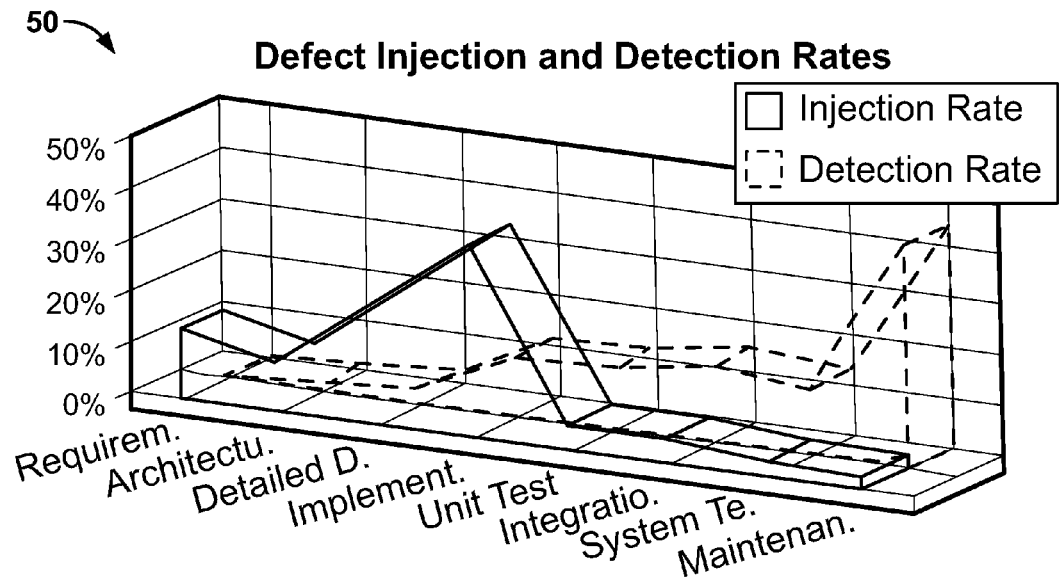
FIG. 2 is a three-dimensional graph illustrating the technical problem of error injection and defect detection rates in the life cycle of the conventional software development process of FIG. 1.
Figure 3:
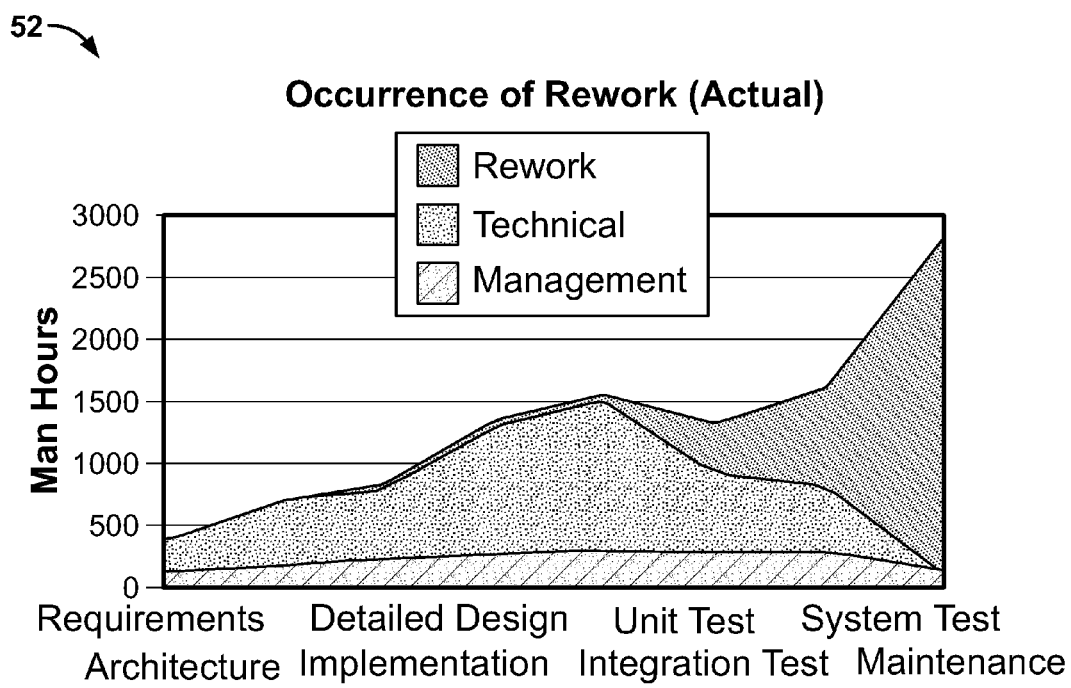
FIG. 3 is a three-dimensional graph illustrating the amount of rework required along the software development process as a result of the manner of testing employed in the conventional software development process of FIG. 1.
Figure 4:
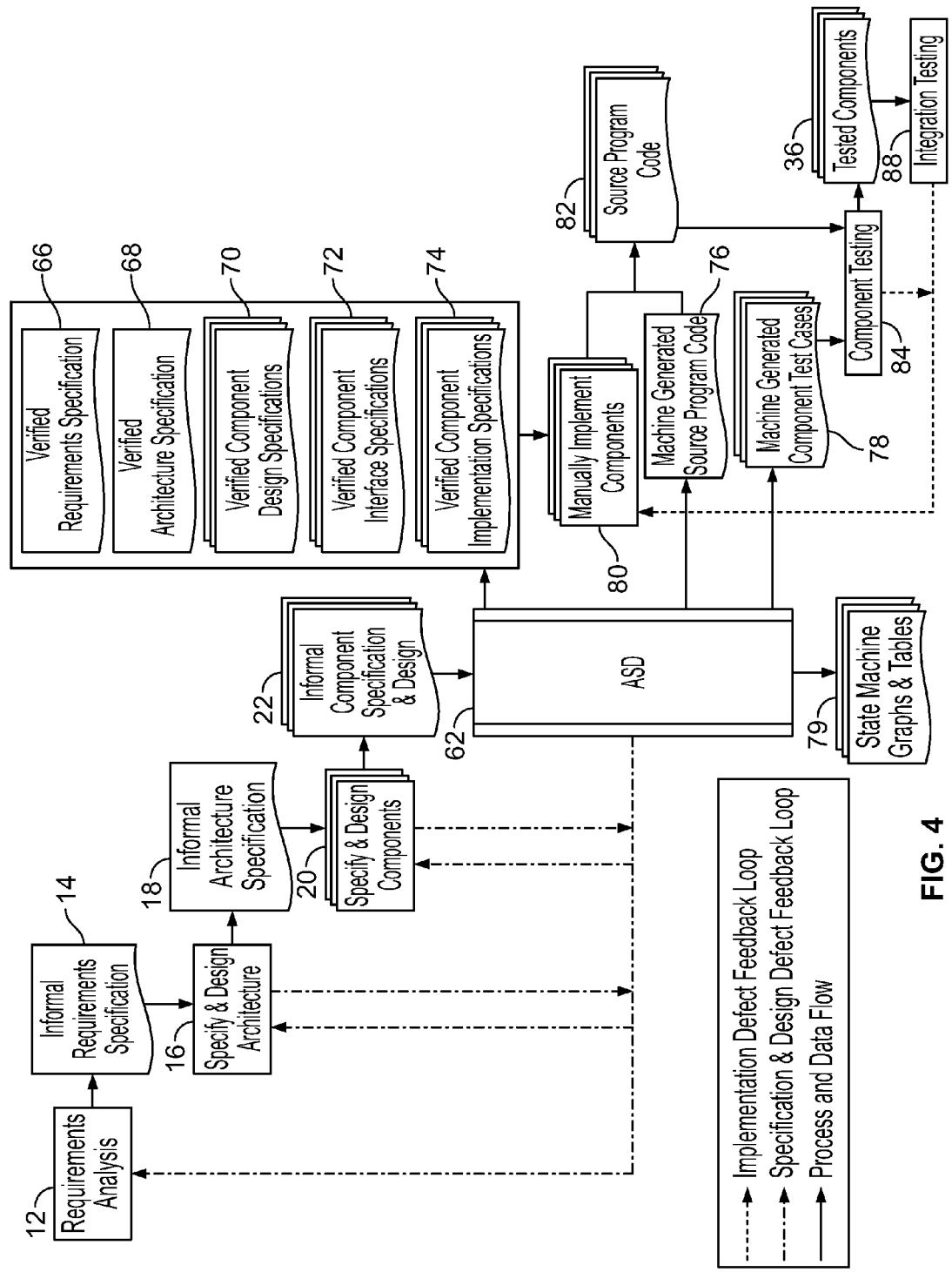
FIG. 4 is a schematic block diagram showing a modified software development process and system, including an integrated Analytical Software Design (ASD) system, according to a first embodiment of the present invention.
Figure 5:
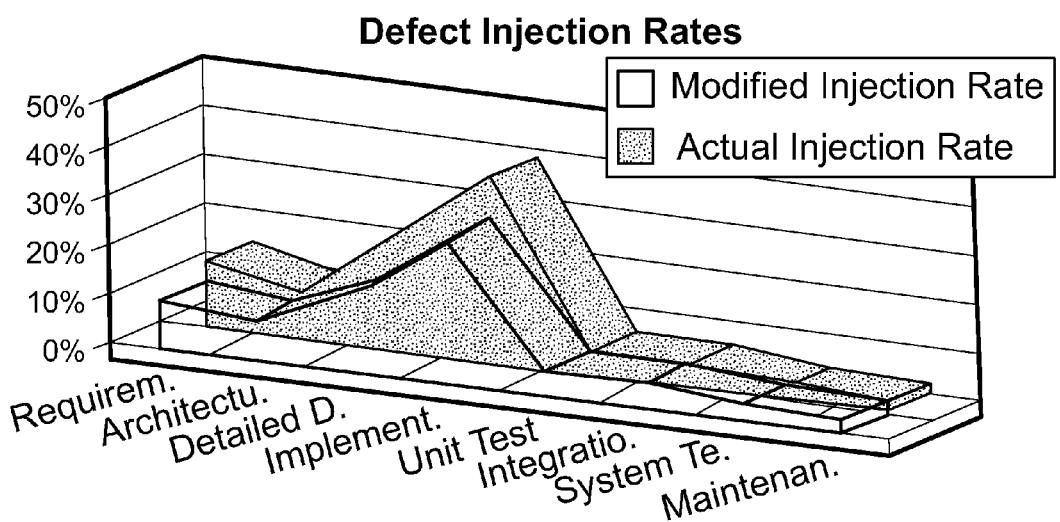
FIG. 5 is a three-dimensional graph showing a graphical comparison between the actual defect injection rate in the conventional Software Development Process and the modified defect injection rate achieved with the first embodiment of FIG. 4, which introduces the Analytical Software Design (ASD) system.
Figure 6:
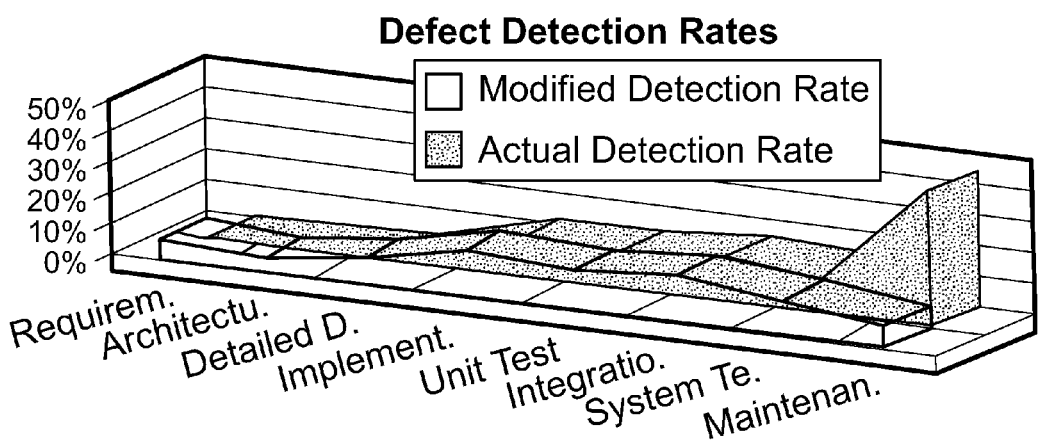
FIG. 6 is a three-dimensional graph showing a graphical comparison between the actual defect detection rate in the conventional Software Development Process and the modified defect detection rate of the first embodiment of FIG. 4, which introduces the ASD system.

Referring now to FIG. 4 again, a process for software development 60 incorporating an Analytical Software Design (ASD) system 62 according to a first embodiment of the present invention is now described. The ASD system 62 integrates into a conventional software development process and has some common components as is described in detail below. When using the ASD system 62, the modified software development process is as follows:

1. Requirements Analysis 12: This is the same has been described previously in relation to FIG. 1.
2. Specify and Design Architecture 16: This is the same has been described previously in relation to FIG. 1.
3. Specify and Design Components 20: This is the same has been described previously in relation to FIG. 1.
4. Analytical Software Design (ASD) System 62: The inputs to the ASD system 62 are the Informal Requirements Specifications 14, Informal Architecture Specifications 18 and the Informal Component Specifications and Designs 22. The outputs of the ASD system 62 are as follows:
   a. Verified Specification output 64:
      i. Verified Requirements Specification 66;
      ii. Verified Architecture Specification 68;
      iii. Verified Component Design Specifications 70;
      iv. Verified Component Interface Specifications 72;
      v. Verified Component Implementation Specifications 74.
   b. Machine-Generated Source Program Code 76 for parts of the software system.
   c. Machine Generated Component Test Cases 78 are also generated for use in a component testing procedure.
   d. State Machine Graphs and Tables 79 are also generated.
   A detailed description of the ASD System is given later.
5. Manually-Implement Components 80: Software implementation experts write the remaining source programs by hand for those parts of the system that cannot be generated automatically by the ASD system 62, using the verified specifications 66,68,70,72, 74 produced by the ASD system 62.
6. Component Testing 84: The source programs 82 implementing each component are tested individually and independently of each other against the verified specifications and designs using the component test cases 78 machine generated by the ASD system 62. Because the implementation is based on verified specifications and designs, the errors discovered in this phase are primarily implementation errors only and are only related to those parts of the source programs written by hand 80. The source programs 82 generated by the ASD system 62 are a functionally correct representation of the design. This is in contrast to the situation in the unmodified software development process when the ASD system 62 is not used. FIG. 4 shows that the Specification and Design Defect Feedback Loop 32 shown in FIG. 1, no longer extends to the implementation and testing phases.
7. Integration Testing 88: In this step, the individually tested components 86 are integrated and tested to form the complete software system. During this step, a class of defects concerned with the interactions between the components are typically encountered for the first time. Because the implementation is based on verified specifications and designs, the errors discovered in this phase are primarily implementation errors only. The more difficult issues such as concurrency have been removed during design verification. FIG. 4 shows that the Specification and Design Defect Feedback Loop 32 no longer extends to the implementation and testing phases.

The ASD system 62 effectively breaks up the design testing into two different non-overlapping parts: the first being testing of requirements, architecture and components for defects in their specification and design; the second being the testing of verified requirements, verified architecture, verified component design, verified component interfaces and verified component implementations, individually and in an integrated manner for defects in their implementation.

Figure 7:
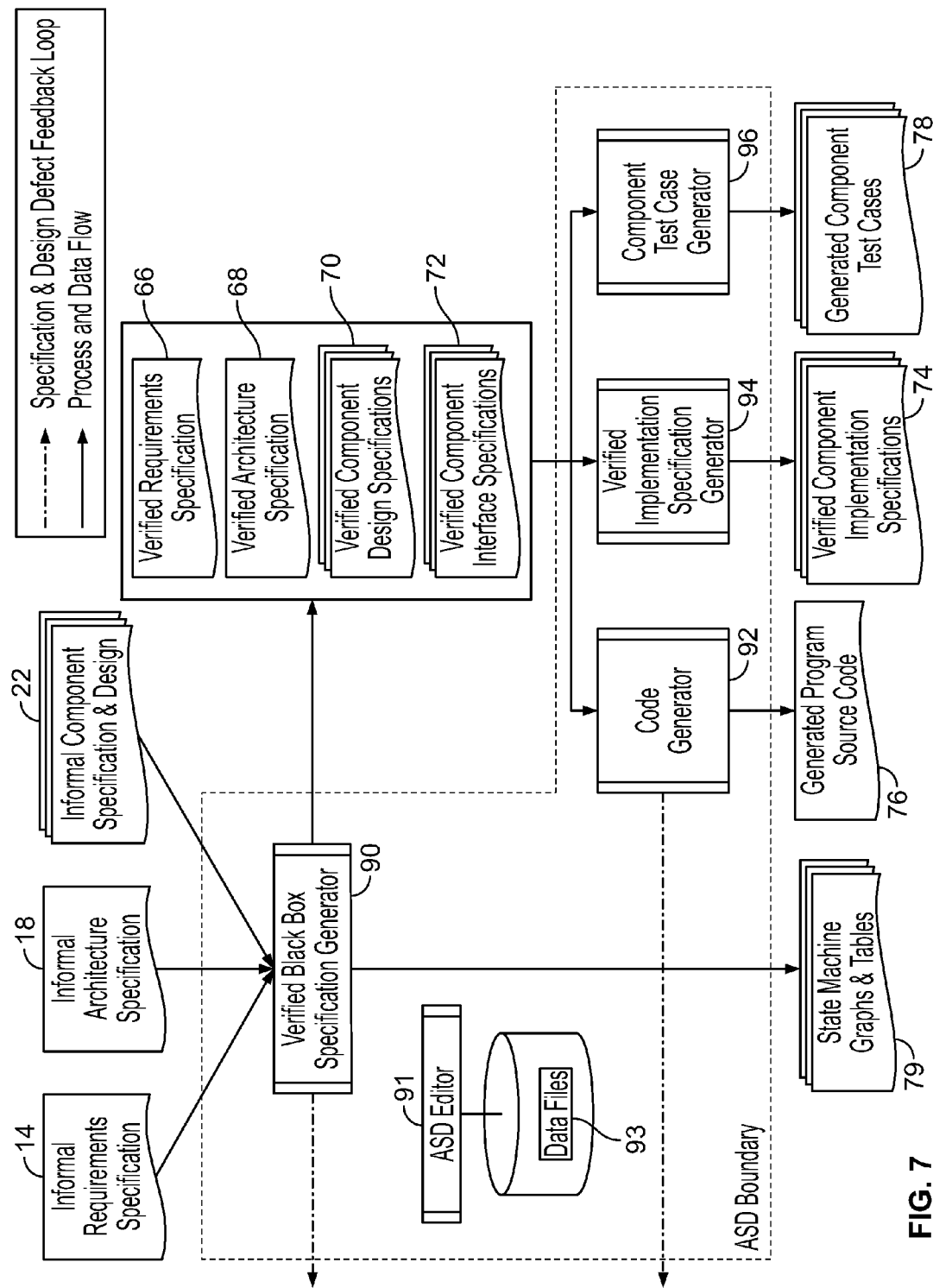
FIG. 7 is a schematic overview block diagram of the ASD system of the first embodiment of FIG. 4, showing a Verified Black Box Specification Generator and a Verified Implementation Specification Generator.

Referring now to FIG. 7, the ASD system 62 is now described in greater detail. The ASD system 62 is the heart of the first embodiment and comprises the following elements:

1. Verified Black Box Specification Generator 90: The first processing stage of the ASD system 62 carried out by the Verified Black Box Specification Generator 90 is to produce formal functional specifications of the requirements, architecture, component designs and component interfaces from the informal specifications 14, 18, 22 of the requirements, architecture, component designs and component interfaces. The output of this stage are:
   a. Verified Requirements Specification 66,
   b. Verified Architecture Specification 68,
   c. Verified Component Design Specifications, 70 and
   d. Verified Component Interface Specifications 72.

The Verified Black Box Specification Generator 90 of the ASD system 62 includes a processing module called an ASD Editor 91, which forms part of the ASD system 62, which interfaces with software architects and designers and is used to capture the results of this work in a tabular form. The ASD Editor 91 stores the results in data files 93 in a form usable as input to the Model Generator, described later.

Capturing functional specifications and designs in this way is an iterative process with continuous feedback between product specialists, domain experts, software architects and designers with feedback into all previous phases in the Software Development Process to correct specification and/or design defects made in those earlier phases.

At any time during or after this process, software architects and designers can use the ASD Editor 91 to print the results in the form of tables and state machine graphs 79.

2. Code Generator: The Code Generator 92 is a computer program that takes as input the Verified Requirements Specification 66, Verified Architecture Specification 68, Verified Component Design Specifications 70 and Verified Component Interface Specifications 72 in data files produced by the ASD Editor 91 and produces Generated Program Source Code 76 in a programming language that implements (part of) the component design. This first embodiment generates source programs in C and C++. It is easily extendible to other programming languages as the need arises. This component is described in detail later.

3. Verified Implementation Specification Generator 94: Those parts of the software for which source program code 82 cannot be generated automatically by the Code Generator 92, must be programmed by hand. To make this as straightforward and error-free as possible, detailed verified implementation specifications 74 are generated using the Box Structure Development Method as described later. The inputs are the Verified Component Designs 66,68,70,72 produced by the Verified Black Box Generator 90 and the outputs are the Verified Component Implementation Specifications 74. The ASD Editor 91 of the Verified Black Box Generator 90 is used to capture the Verified Component Implementation Specifications 72, and store them in the form of data files (not shown).

4. Component Test Case Generator 96: The Component Test Case Generator 96 is a processing module that takes as inputs the data files produced by the ASD Editor 91—namely, the Verified Requirements Specification 66, Verified Architecture Specification 68, Verified Component Design Specifications 70 and Verified Component Interface Specifications 72—and generates a large selection of statistically selected Component Test Cases 78. One of the possible forms in which these test cases can be generated is as computer source programs in an appropriate programming language. The embodiment of the present invention is disclosed generating component test cases in Perl, C, C++, Visual Basic and Java. This is easily extendible to other programming languages as the need arises. This component is described in greater detail later.

Figure 8:
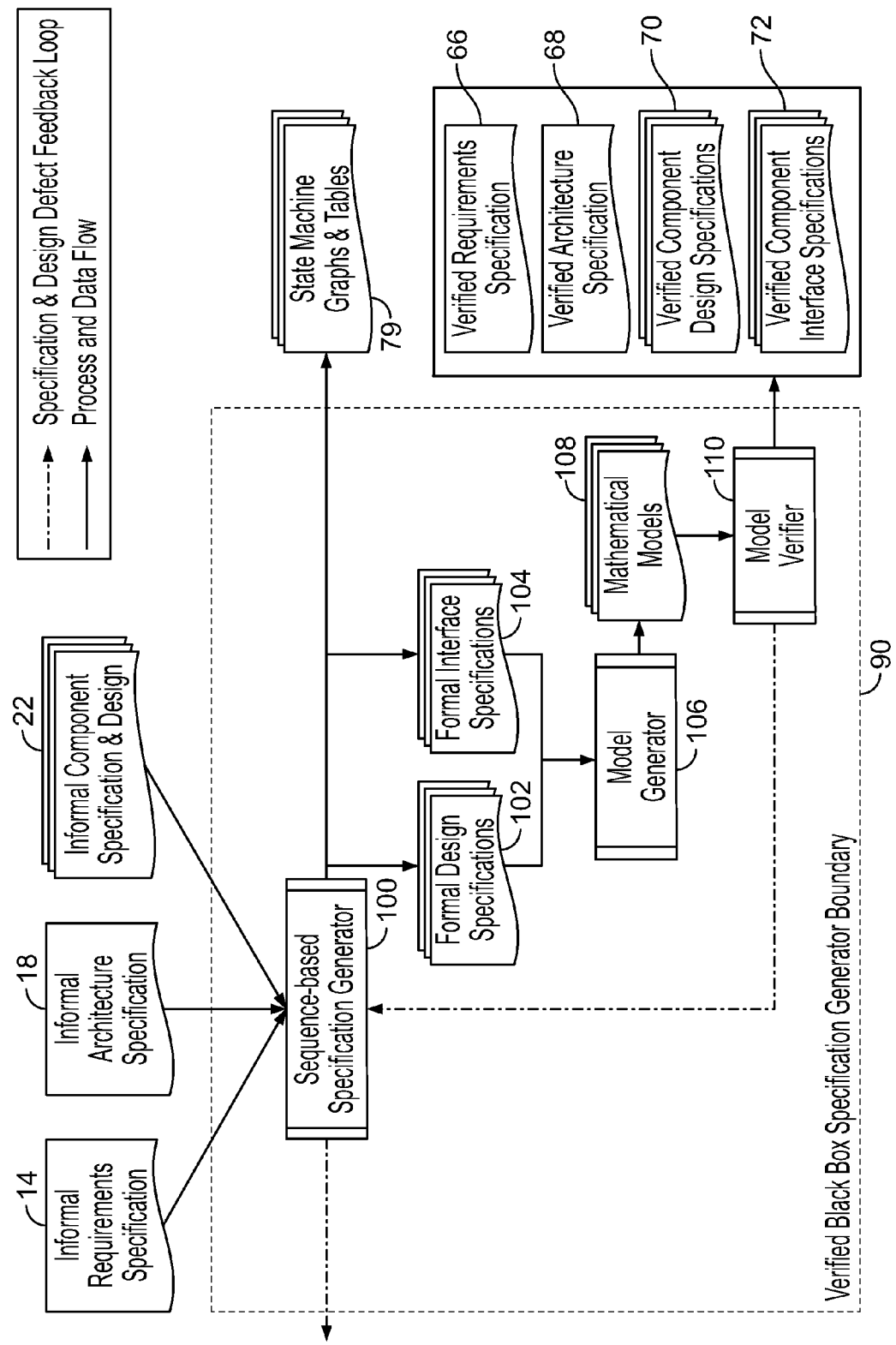
FIG. 8 is a schematic block diagram of the ASD system showing a more detailed overview of the Verified Black Box Specification Generator of FIG. 7.

Referring now to FIG. 8, the Verified Black Box Specification Generator 90 introduced in FIG. 7, is now described in greater detail. The Verified Black Box Specification Generator 90, produces formal functional specifications of the requirements, architecture, component designs and component interfaces from the informal specifications of the requirements, architecture and component designs and verifies them for correctness. The produced verified specifications are: Verified Requirements Specification 66, Verified Architecture Specification 68, Verified Component Design Specifications 70 and Verified Component Interface Specifications 72. In addition, it produces a printed tabular version of the specifications and a plotted representation of the specified behaviour in the form of State Machine Graphs and Tables 79 to enable validation.

The Verified Black Box Specification Generator 90, comprises the following components:

1. Sequence-Based Specification Generator 100: Using the ASD Editor 91, described later, software design experts analyse the informal specifications 14,18,22 and apply the Sequence-Based Specification Method [PTLP98, PP03] to produce an under-specified Black Box Specification describing the required functional behaviour, visible at each interface, of each software component to be implemented. At the same time, all other hardware and/or software components, with which the software to be developed must interface, are also identified and, if Black Box Specifications for them do not already exist, they are produced. These under-specified Black Box Specifications 104 are a formal, mathematically complete and consistent definition of the required functional behaviour of each component that is visible by its interfaces. They are described as under-specified because all implementation details are suppressed and hidden from their eventual users. As a result, the interface behaviour is almost always nondeterministic.

When all interfaces have been formally specified in the formal interface specifications 104, each component must be designed. Software design experts use the ASD Editor 91 and again apply the Sequence-Based Specification Method, this time to develop a deterministic design of each component 102. The design must properly reflect the required interface behaviour specified in the Component Interface Specification 72 and it must properly comply with the specified interface behaviour of the components it makes use of. In order to ensure that this is the case, the designs and interface specifications are verified against each other and against any other behavioural requirements derived from the informal specifications.

In addition, at any time during or after this process, the ASD Editor 91 can be used to produce a printed tabular version of the specifications and a plotted representation of the specified behaviour in the form of State Machine Graphs and Tables 79 to enable validation.

2. Model Generator 106: The Model Generator 106 is a computer program that takes as input the Component Interface Specifications 104 and Component Design Specifications 102 generated by the Sequence-Based Specification Generator 100. These are in the form of data files stored by the ASD Editor. From these data files, the Model Generator 106 generates mathematical models 108 for the purposes of verifying of component designs and interfaces and saves these models as data files stored on a computer and available for input into the Model Verifier 110.

The Model Generator 106 implements the generic algorithms described later and automatically generates the necessary mathematical models in a suitable notation. One such mathematical notation is the existing process algebra CSP [Hoa85, Ros98], which is the implementation used in the present first embodiment. The Model Generator 106 is described in detail later.

3. Model Verifier 110: Once the mathematical models of the system behaviour have been generated, they are analysed to determine that the modelled software components have the required behaviour. The mathematical models generated by the Model Generator 106 are input to an existing formal verification tool (not shown) appropriate to the mathematical notation in which the models are generated. For models expressed in CSP, the appropriate verification tool is the model checker FDR [Ros94, For03]. The first embodiment of the present invention is disclosed using this verification tool. This component is described in detail later.

The Model Verifier 110 identifies errors in the component interface specifications 104 and design specifications 102 and inconsistencies between them. When such errors are identified, they are fed back into the informal specifications and/or the formal specifications resulting from the Sequence-Based Specification Generator 100. After corrections are made, updated mathematical models 108 are generated using the Model Generator 106 and verified again using the Model Verifier 110. This iterative process continues until an error free set of Verified Component Interface Specifications 72 and Verified Component Design Specifications 70 are achieved. This is depicted on FIG. 8 as the Specification and Design Defect Feedback Loop 32.

Figure 9:
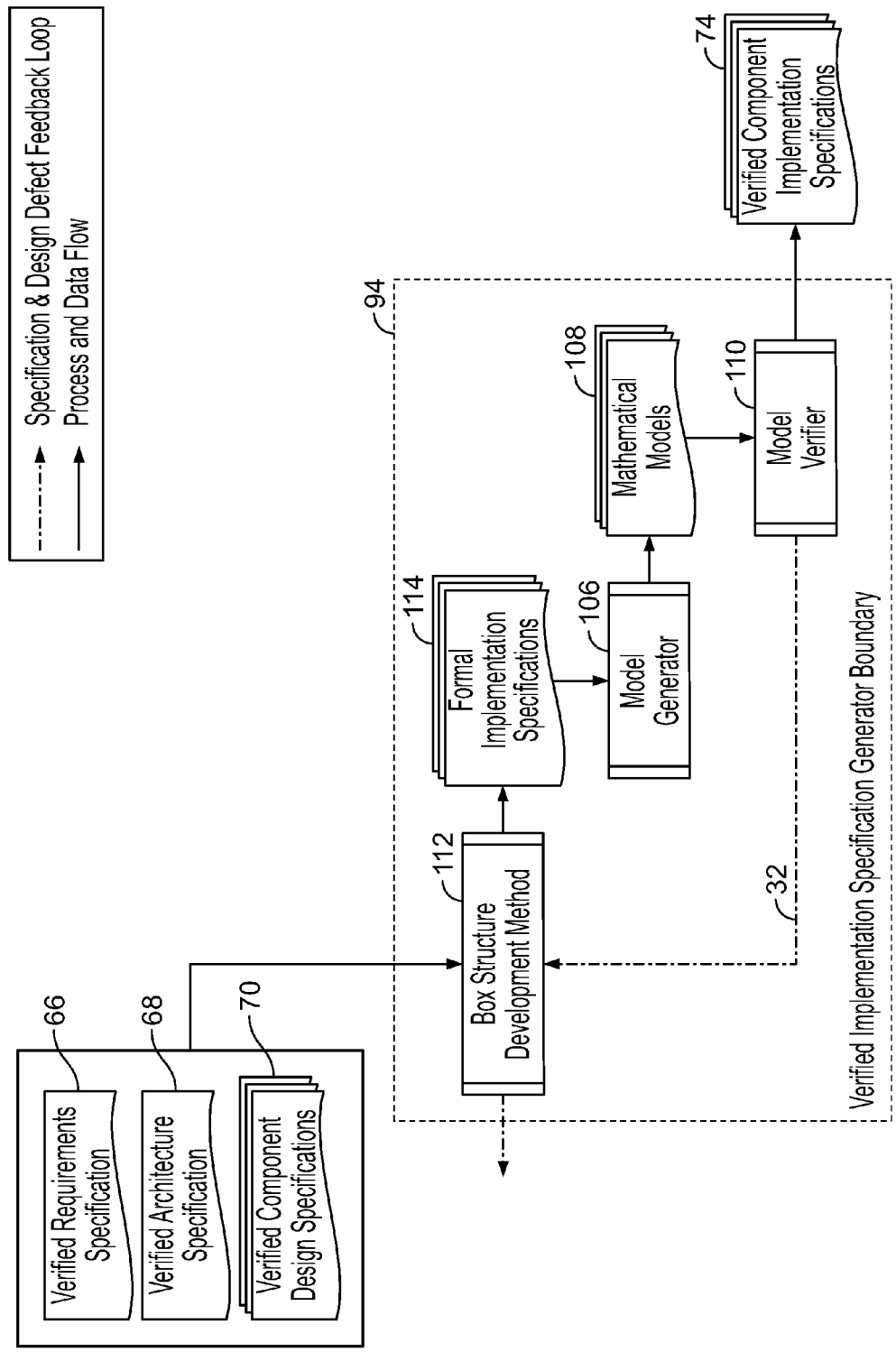
FIG. 9 is a schematic block diagram of the ASD system showing a more detailed overview of the Verified Implementation Specification Generator of FIG. 7.

Referring now to FIG. 9, The Verified Implementation Specification Generator 94 is now described. It produces detailed Verified Implementation Specifications 74 for those parts of the software components for which the necessary Program Source Code 82 cannot be generated automatically and must be programmed by hand. It comprises the ASD Editor 91 (described later), the Model Generator 106 described in detail later, the Model Verifier 110 described in detail later and the application of an existing method, the Box Structure Development Method 112 (BSDM) [PTLP98].

As inputs, the Verified Implementation Specification Generator 94 takes Verified Component Design Specifications 70 produced as output by the Verified Black Box Specification Generator 90 and stored in the form of the data files by means of the ASD Editor.

The outputs produced are Verified Component Implementation Specifications 74 in the form of State Box Function Specifications from which software developers can produce the necessary source program code by hand and against which the source program code can be validated by means of conventional code inspection practices.

As described in FIG. 9, the Verified Implementation Specification Generator 94 comprises the following components:

1. Box Structure Development Method 112 (BSDM): Software design experts use the ASD Editor 91 to apply the Box Structure Development Method 112 to the Verified Component Design Specifications 70 of a component in order to produce Formal Implementation Specifications 114. This output is captured in the form of a set of state box tables that collectively represent a deterministic state box specification describing the detailed implementation of the component. This is a mathematically complete and consistent specification from which software development experts can produce program source code by hand. The ASD Editor 91 stores the generated implementation specifications in a data file in a form that can be input by the Model Generator 106.

Applying the BSDM 112 to produce detailed implementation specifications is an error prone activity and when it has been done, it is necessary to verify the resulting Formal Implementation Specifications 114 against the Verified Component Design Specifications 70 in order to detect and remove any errors that have been made.

2. Model Generator 106: This is a computer program that takes as inputs the Verified Component Design Specifications 70 and the Formal Implementation Specifications 114 in the form of data files stored by the ASD Editor. From these data files, the Model Generator 106 generates mathematical models 108 for the purposes of verifying whether the Formal Implementation Specifications 114 satisfy of the Verified Component Design Specifications 70. These models 108 are stored as data files on the computer and are available as inputs to the Model Verifier 110.

The Model Generator 106 implements the generic algorithms presented below and automatically generates the necessary mathematical models 108 in a suitable notation. One such mathematical notation is the existing process algebra CSP [Hoa85, Ros98], which is the implementation used in the present first embodiment of the present invention. This is described in detail below.

3. Model Verifier 110: Once the mathematical models 108 of the Verified Component Design Specifications 70 and proposed Formal Implementation Specifications 114 have been generated, they are analysed to determine that the modelled Formal Implementation Specifications 114 satisfy all properties specified by the Verified Component Design Specification 70. The mathematical models 108 generated by the Model Generator 106 are input into an existing formal verification tool appropriate to the mathematical notation in which the models 108 are generated. For models 108 expressed in CSP, the appropriate verification tool is the model checker FDR [Ros94, For03]. The present first embodiment uses this verification tool. The Model Verifier 110 is described in detail later.

The Model Verifier 110 identifies errors in the Component Implementation Specifications 74 and any inconsistencies between the Component Implementation Specifications 74 and the Verified Component Design Specifications 70. When such errors are identified, they must be fed back into the Box Structure Development Method 112 phase to produce updated Formal Implementation Specifications 114. After the corrections are made, new mathematical models 108 are generated by the Model Generator 106 and verified again using the Model Verifier 110. This iterative process continues until error-free Verified Component Implementation Specifications 74 are produced. This is depicted in FIG. 9 as the Specification and Design Defect Feedback Loop 32.

It frequently occurs that initial versions of the Formal Implementation Specifications 114, although correct with respect to the Verified Component Design Specifications 70, are not immediately suitable for use by software development experts to produce the program source code by hand. In this case, the Verified Implementation Specifications 74 are transformed and optimised by hand, using mathematical techniques such as Boolean algebra and predicate logic; this is in contrast to conventional programming practices where such detailed optimizations are performed as part of the programming phase.

In the ASD system 62, such transformations and optimizations are performed as much as possible on the Formal Implementation Specifications 114 for the following reason: Each time the Formal Implementation Specifications 114 are transformed and optimised manually, the Model Generator 106 is used to generate corresponding mathematical models 108 and the Model Verifier 110 is used to automatically verify that they satisfy the Verified Component Design Specifications 70. In contrast, in the conventional prior art approach described in FIG. 1, such transformations would be made manually during the programming phase and cannot be verified automatically.

Figure 10:
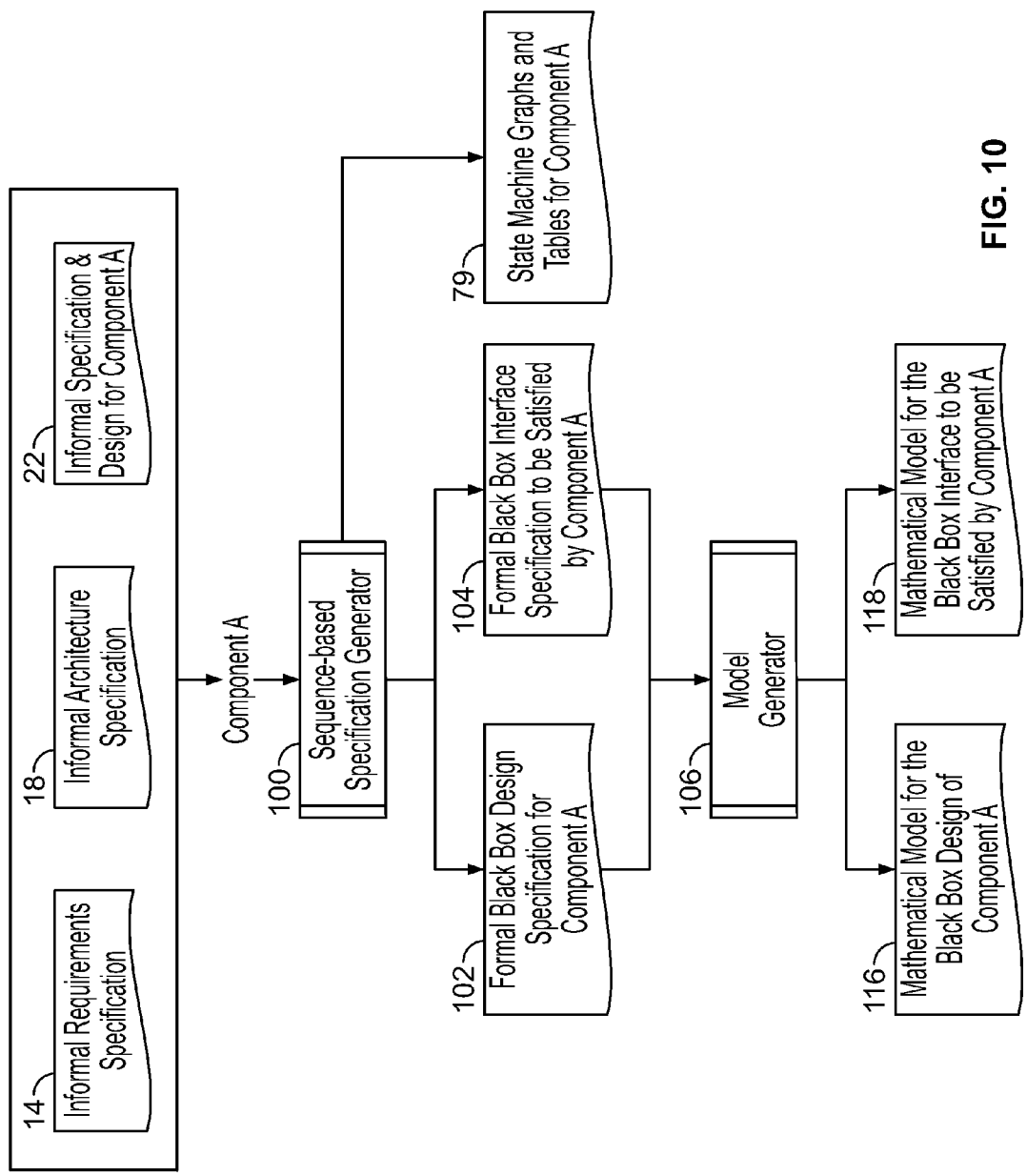
FIG. 10 is a schematic block flow diagram showing a more detailed overview of a process for generating mathematical models for a single software Component A using the first embodiment of FIG. 7.
Figure 12:
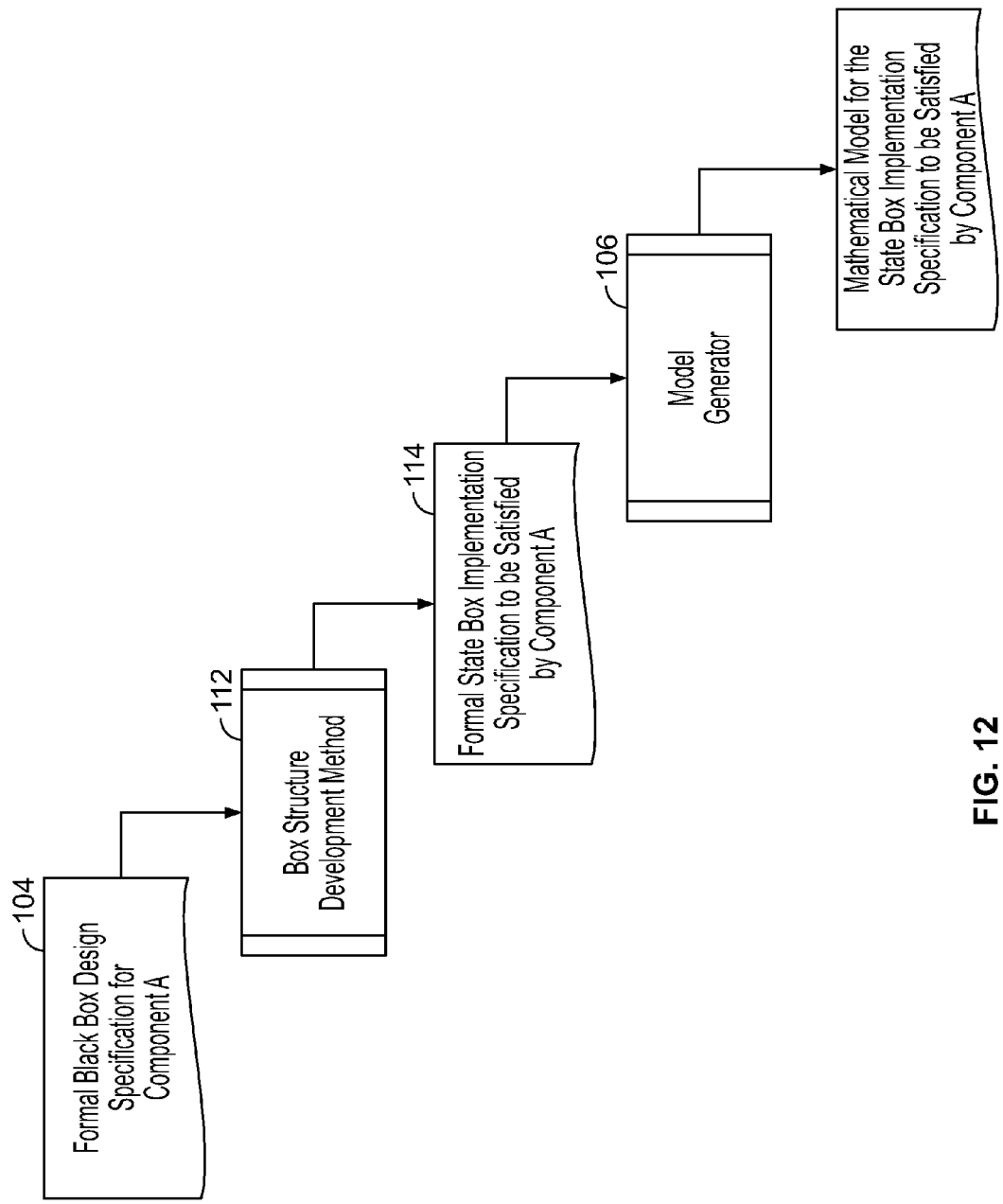
FIG. 12 is a schematic block flow diagram showing a more detailed overview of a process for generation mathematical models for the implementation specification of a single software Component A using the first embodiment of FIG. 7.

The Model Generator 106 is now described in greater detail with reference to FIGS. 10 and 12. FIG. 10 depicts how models 108 are generated from component interface specifications 72 and component design specifications 70. FIG. 12 depicts how models 108 are generated from the component implementation specification 74.

The Model Generator 106 is a processing module that takes as input the Component Interface Specification 104 and Component Design Specifications 102 generated by the Sequence-Based Specification Generator 100 and the Component Implementation Specifications 74 generated by the Box Structure Development Method 112. These are in the form of data files stored by the ASD Editor 91 (described later). From these data files, the Model Generator 106 generates mathematical models 108 for the purposes of verifying of component designs, interfaces and intended implementation and saves these models as data files stored on a computer and available for input into the Model Verifier 110.

The Model Generator 106 implements the generic algorithms presented below and automatically generates the necessary mathematical models in a suitable notation. One such mathematical notation is the existing process algebra CSP [Hoa85, Ros98], which is used in the present first embodiment of the present invention.

The Model Generator 106 forms an important inventive part the ASD System 62 by enabling the output from the sequence-based specification and box structure development described above, to be translated directly into the Mathematical Models 108 needed for subsequent design verification steps. The algorithms used in this translation have been proven mathematically by the present inventor to produce mathematical models 108 that describe exactly the same behaviour as the Sequence-Based Specifications and Component Implementation Specifications from which they are translated. It is this unique link between existing formal techniques and theories that enables them to be integrated into an industrial software development environment and makes it possible and practical for software architects and designers to mathematically verify the designs of industrial scale software systems without having to become experts in the mathematical verification techniques employed.

In order to understand the functions of the Model Generator 106 and the model verifier 110 completely, it is necessary and helpful to consider the background of the existing formal methods that are used for implementing the Model Generator component 106 of the ASD system 62. The following description represents this background.

Box Structure Development Method

The box structure development method [Mil88, MLH86] provides a framework for the application of function theory to software development. It defines three functional views of a software system, forming an abstraction hierarchy that allows for stepwise refinement and verification: A black box is a state-free description of the external view of the system; a state box is derived from the black box and introduces internal state; and the final view is the clear box which is an implementation of the state box in a chosen language. Each view must be complete, consistent and traceably correct. Below, the necessary background on black boxes and state boxes is provided for the full understanding and disclosure of the ASD system 62.

Black Box Specifications

A black box specification is the most abstract view and defines the external behaviour of a system or component in terms of input stimuli from and output responses observable to its environment; S and R denote the set of stimuli and responses respectively. A black box is characterised by a black box function BB: $S^* \rightarrow R$ that maps stimulus history to responses, where $S^*$ is the set of all finite sequences over S.

A black box function must be total: every stimulus sequence is mapped to a response. In practice, there may be a stimulus that does not invoke a response; for completeness, a special response null is added to the set R to handle this case. For example, in the initial state of a system prior to any stimulus input, no response can (spontaneously) occur and therefore BB ($\diamond$)=null. Sequences of stimuli that are illegal must be included and are mapped to the special value $\omega \in R$. Illegal sequences are extension-closed: all extensions of illegal sequences are also illegal and result in response $\omega$.

The black box is developed from the informal requirements and is required to be complete, consistent and traceably correct with respect to them. In [PP03], a sequence-based software specification method is presented for systematically defining a black box specification that ensures completeness and consistency, as well as retaining complete traceability with the original informal requirements.

The sequence-based specification method involves the ordered enumeration of all possible stimuli sequences in $S^*$ in order of length, starting with the empty sequence (i.e., of length 0), and the assignment of a response from R to each one. For each length, the ordering must be complete. During this enumeration, equivalences between sequences may arise: Two sequences $u, v \in S^*$ are Mealy equivalent, written $u \equiv_{\rho Me} v$, precisely when all nonempty extensions of them result in the same response; i.e., for all $$z \in S^* - \{\diamond\}, BB(uz) = BB(vz).$$

When equivalence arises between a sequence u and a previously enumerated one v, the response associated with u is noted, together with its equivalence to v. The set $S^*$ is partitioned into a finite set of equivalence classes as defined by $_{\rho Me}$ where, for every sequence $u \in S^*$, there is a unique irreducible normal form v such that $u \in [v]_{\rho Me}$. These unique normal forms for the reduction system defined by $_{\rho Me}$ are known as canonical sequences.

The format presented in [PTLP98] is used throughout this document, where the sequence enumeration is presented as a set of enumeration tables: one for each canonical sequence. For example, an enumeration table for some canonical sequence $c_i$ takes the form:

| Stimulus | Response | Equivalence | Trace |
| --- | --- | --- | --- |
| $s_1$ | $r_1$ | $c_j$ | $R_1$ |
| $s_2$ | $r_2$ | $c_i \cap \langle s_2 \rangle$ | $R_2$ | where $\{s_1, s_2\} = S$ (since every extension must be complete), $r_1, r_2 \in R$ and $c_j$ is an existing canonical sequence (identified earlier in the ordering). Only unreduced sequences are used in the equivalences. The first row of the table reads as follows:

$$\forall u \in [c_i]_{\rho Me} \cdot BB(u \cap \langle s_1 \rangle) = r_1 \,\dot{}\, u \cap \langle s_1 \rangle \in [c_j]_{\rho Me}$$

and this step can be traced back to requirement $R_1$ in the informal requirements specification. Due to the equivalence established, no further extensions of this sequence need to be considered.

In the table above, extending sequences in $[C_i]_{\rho Me}$ with $s_2$ invokes response $r_2$ and are not reducible to a previously enumerated sequence. Thus, $c_i \cap \langle s_2 \rangle$ is a new canonical sequence, for which an enumeration table must be defined.

The enumeration process is complete once all sequences have been assigned to an equivalence class: A complete enumeration specifies exactly one value for every sequence $z \in S^*$, and therefore defines a complete, consistent black box specification [PP03].

State Box Specifications

A state box specification is the next step towards implementation and is derived from a black box specification. It introduces state variables to capture distinctive characteristics of the stimulus history, such that the external behaviour is equivalent to that specified by the black box (without needing to make reference to the stimulus history). It is characterised by a total state box function SB: $(Q \times S) \rightarrow (Q \times R)$, where Q, S and R are the sets of states, stimuli and responses respectively.

The states in Q represent characteristic predicates, one distinct state for each equivalence class, over the partition of $S^*$ Defining state variables and their unique instantiations for each equivalence class is achieved through a process called the canonical sequence analysis and is described in [PTLP98].

A black box and state box with functions $BB: S^* \rightarrow R$ and $SB: (Q \times S) \rightarrow (Q \times R)$ respectively are behaviorally equivalent precisely when, for every sequence in S, they invoke the same response.

The state box specification is represented as a set of tables, one for each stimulus $s \in S$ of the form:

| Current State | Response | New State | Trace |
| --- | --- | --- | --- |
| $q_1$ | $R_1$ | $q_2$ | $R_1$ |
| $q_2$ | $R_2$ | $q_1$ | $R_2$ | where $q_1, q_2 \in Q$ and $r_1, r_2 \in R$. In a complete, consistent state box specification, from each table for stimulus $s \in S$, one must be able to determine the unique response in any given state of the system. Thus, the Current State column must cover all states.

The CSP Notation

CSP [Hoa85, Ros98] is a process algebra for describing concurrent processes that interact with one another or their environment through some form of communication.

CSP has a rich expressive language and a collection of semantic models for reasoning about process behaviour.

A process is defined in terms of synchronous, atomic communications, known as events, that it can perform with its environment. For example, process a→P can initially perform event a and then act like process P. The notation ?x:A→P(x) (prefix choice construct) denotes a process that is willing to perform any event in A and then behave like process P(x).

Channels carry sets of events; for example, c.5 is an event of channel c. The process c?x→$P_x$ inputs a value x from channel c and then acts like $P_x$. The process d.x→Q performs the event d.v, where v is the value assigned to x, and then acts like process Q.

In CSP, there are two types of choice operators: P □ Q denotes an external choice between P and Q; the initial events of both processes are offered to the environment; when an event is performed, the choice is resolved. P⊓Q denotes an internal choice between P and Q; the process can act like either P or Q, with the choice being made according to some internal criteria (and hence, the environment has no control over how the choice is resolved).

As an example, consider a simple drink vending machine that offers a menu choice of dispensing tea and coffee, the choice of which is made by the environment. This could be modelled by the following CSP process:

*VendingMachine* = tea → Dispense(tea)

□ coffee → Dispense(coffee)

Dispense(drink) = dispense·drink → *VendingMachine*

The choice (in the initial state of the process VendingMachine) between tea and coffee is modelled as an external one, reflecting the fact that the vending machine is prepared to offer either drink, the decision of which is made by its environment (i.e., the user of the vending machine). Once the choice has been resolved, the process dispenses the selected drink, modelled by the events dispense.tea and dispense.coffee respectively.

As a second example, consider the following extension to the vending machine model presented above: Once the environment (i.e., the user) has selected the drink to be dispensed, the vending machine either dispenses the chosen drink (as is the case above) or displays an error message indicating that there are insufficient ingredients for the chosen drink. The choice of which response the vending machine makes is made internally within the vending machine and is therefore modelled as an internal choice within the CSP model as follows:

*VendingMachine* = tea → Dispense(tea)

□ coffee → Dispense(coffee)

Dispense(drink) = dispense·drink → *VendingMachine*

⊓

ErrorMessage → *VendingMachine*

Processes can be placed in parallel, where they synchronise upon (all or specified) common events or interleaved, where they run independently of one another. For example, if two processes in a software system communicated with each other by exchanging messages, each process would be modelled individually in CSP and the two models placed in parallel, synchronising on a set of events corresponding to the set of messages being exchanged.

Algorithms 1 & 2: Translating Black Boxes into CSP

The starting point for specifying a component using the box structure development method is to construct a black box specification that describes the required external behaviour of the component, using the Sequence-Based Specification Method.

Algorithm 1 presented below is an implementation of how one can translate a set of sequence-based enumeration tables that encode a black box specification into a corresponding CSP process. For the purposes of clarity, an enumeration table for some canonical sequence c is represented as the set $Rows_{BB}$(c) comprising one element per row of the table and taking the form (s, r, $c_j$), where s, r and $c_j$ represent the stimulus, response and equivalence columns respectively. FIG. 14 illustrates an example of an enumeration table for some canonical sequence c and its corresponding set $Rows_{BB}$(c). For the purposes of generating the CSP model, the first column containing the unique sequence number of the row and the fourth column capturing the traceability to informal requirements are ignored, as they are not relevant in the CSP analysis of the system.

Algorithm 1: For a given sequence-based specification that encodes a black box specification with function BB: S*→R, a corresponding CSP process $P_{BB}$ is defined as follows:

1. The sequence-based specification comprises a set of enumeration tables, one per canonical sequence. For every canonical sequence $c_i$ in the enumeration, a CSP process $P_{ci}$ is defined as follows:

$P_{ci}$=□{Q(s,r,$c_j$)|(s,r,$c_j$)∈$Rows_{BB}$($c_i$)} where

Q(s,r,$c_j$)=s→r→$P_{cj}$

This produces a collection of mutually recursive CSP processes $P_{c0}$, ..., $P_{cn}$, one process $P_{ci}$ for each canonical sequence $c_i$ in the enumeration.

2. The CSP process $P_{BB}$ is then defined as follows:

$P_{BB}$=$P_{c0}$ where $c_0$ represents the shortest canonical sequence which, by definition, is ◇.

FIG. 15 illustrates the application of Algorithm 1 to translate an enumeration table into a corresponding CSP process. It shows the CSP corresponding to each row in the table and how this is combined into a CSP process equation representing the behaviour of the enumeration table as a whole.

Algorithm 1 above does not address the case where stimuli are defined using predicates. An important feature of the sequence-based enumeration approach for practical use is the ability to abstract away details by introducing predicates that enables one to distinguish the resulting responses and future behaviour of a single input stimulus. For example, the following illustrates how one may divide a single stimulus s into two abstract stimuli using predicates within an enumeration table:

| Stimulus | Response | Equivalence | ... |
|---|---|---|---|
| s: p | $r_1$ | $C_i$ | ... |
| s: ¬p | $r_2$ | $C_j$ | ... | where, s∈S is therefore an input stimulus, p is a predicate, $r_1$≠$r_2$ and $C_i$≠$C_j$ (i.e. the resulting responses and future behaviours are distinct, and depend on the value of the predicate p).

Furthermore, predicates are typically defined in terms of specification functions that, in turn, are defined over the history of stimuli sequence. For example, the predicate p may determine whether or not there are sufficient resources to enable the stimulus s to take place. In this case, p may be defined as follows:

$$p=(\text{Resource}(h) \neq \emptyset)$$

where Resource(h) is a specification function over the sequence history h. Given h, Resource returns the set of resources that are available. If this set is non-empty, then p evaluates to true, otherwise p is false. A stimulus s whose response depends on this predicate (for example, tea), is then modelled by the special abstract stimuli s:p and s: ¬p. For example, the table above may become:

| Stimulus | Response | Equivalence | ... |
|---|---|---|---|
| s: Resource(h) ≠ ∅ | $r_1$ | $C_i$ | ... |
| s: Resource(h) = ∅ | $r_2$ | $C_j$ | ... |

Algorithm 2 below extends Algorithm 1 to handle enumeration tables containing stimuli that are defined in terms of predicates involving specification functions over stimuli history, and translate them into the corresponding CSP models. This is achieved by modelling the stimulus history as state variables; instead of referring to the sequence history, the specification functions are computed in terms of the corresponding state data within the CSP models. The state variables must therefore be defined to accurately reflect the specification functions and history.

Algorithm 2: Given a set of sequence-based enumeration tables that capture a black box function BB:S*→R, a corresponding CSP process $P_{BB}$ is defined as follows:
1. For each specification function used by predicates that define input stimuli, define appropriate state variables. For example, the specification function Resource(h) for a given history h defined above could be captured by the variable Res that represents a set of available resources in any given state.
2. For each canonical sequence $c_i$, express the specification functions in terms of their corresponding variables and for each stimulus, compute all possible before and after values assigned to each variable. This representation should be such that, given any state of the system and a stimulus, one can determine the precise values to be assigned to all state variables. One possible implementation is to capture this in a tabular form.
3. Let $x_1, \ldots, x_k$ represent the state variables capturing the corresponding specification functions derived in the previous step. For every canonical sequence $c_i$ a CSP process $P_{ci}(x_1, \ldots, x_k)$ is defined as follows:

$$P_{ci}(x_1, \ldots, x_k) = \square\{Q(s,r,c_j, \text{update}(c_i,s,(x_1, \ldots, x_k))) | (s,r,c_j) \in \text{Rows}_{BB}(c_i)\}$$

where the function update returns the resulting value for each state variable. These values are derived directly from the tables constructed in the previous step.
The process Q is defined as follows:

$$Q(s, r, C_j, (y_1, \ldots, y_k)) = \begin{cases} \text{state}(p) \& s' \to r \to P_{cj}(y_1, \ldots, y_k), & \text{if } s = s': p, \text{ for some } s' \in S \text{ and predicate } p, \\ s \to r \to P_{cj}(y_1, \ldots, y_k), & \text{otherwise.} \end{cases}$$

where the function state(p) represents the predicate p in terms of the corresponding state variables as opposed to the specification functions. For example, if p was previously defined as:

$$p=(\text{Resource}(h) \neq \emptyset)$$

and the specification function Resource(h) is defined in terms of the state variable Res as described in the previous step of the algorithm, then state (p) may be defined as follows:

$$\text{state}(p)=(\text{Res} \neq \emptyset)$$

The process Q (s, r, $c_j$, $(y_1, \ldots, y_k)$) is defined in terms of the following two cases:
  Case 1 (Predicates): The stimulus s is defined in terms of a predicate and therefore takes the form s=s':p. The resulting CSP process captures the predicate as a guard state (p), defined in terms of the state variables, over the standard sequence of the stimulus s' event followed by the response r event and leading to the process $P_{cj}$.
  Case 2 (No predicates): The stimulus s does not involve predicates and therefore results in the standard CSP definition as defined in Algorithm 1.
4. The CSP process PBS is then defined as follows:

$$P_{BB}=P_{c0}(I_1, \ldots, I_k)$$

where $c_0$ represents the shortest canonical sequence ◊ and $I_1, \ldots, I_k$ are the initial values of each state variable respectively. These initial values are derived directly from the definitions of the specification functions.

Algorithm 3: Translating Under-Specified Black Boxes into CSP

Predicate functions in sequence-based specifications can be used for under-specification [PP03] (without breaking the function theory upon which this approach is built). This form of abstraction is used for designing component interfaces, where the internal actions are hidden from its environment. Under-specification is achieved by introducing undefined predicates to capture the fact that for a given stimulus S, there are a number of possible responses and subsequent behaviour, the decision of which is as yet undefined. Stimulus s is then modelled as the abstract stimuli s:p and s: ¬ p where p is undefined.

Algorithm 3 below extends Algorithm 2 and presents an implementation of how such sequence-based specifications can be translated into corresponding CSP models.

Algorithm 3: Given a set of sequence-based enumeration tables that capture a black box function BB:S*→R, a corresponding CSP process $P_{BB}$ is defined as follows:
1. Let U be the set of all undefined predicates $\{p_1, \ldots, p_n\}$.
2. (Same as Step 1 in Algorithm 2) For each specification function used by predicates that define input stimuli, define appropriate state variables.
3. (Same as Step 2 in Algorithm 2) For each canonical sequence $c_i$, express the specification functions in terms of their corresponding variables and for each stimulus, compute all possible before and after values assigned to each variable. As described in Algorithm 2, one possible implementation for this would be a tabular form.
4. Let $x_1, \ldots, x_k$ represent the state variables capturing the corresponding specification functions derived in the previous step. For every canonical sequence $c_i$, a CSP process $P_{ci}(x_1, \ldots, x_k)$ is defined as follows:

$$P_{ci}(x_1, \ldots, x_k) = \square\{Q(s,r,c_j, \text{update}(c_i,s,(x_1, \ldots, x_k))) | (s,r,c_j) \in \text{Rows}_{BB}(c_i)\}$$

where the function update returns the resulting value for each state variable.

These values are derived directly from the tables constructed in the previous step.
The process Q is defined as follows:

$$Q(s, r, c_j, (y_1, \ldots, y_k)) =$$

$$\begin{cases} \text{state}(p) \,\&\, s' \to r \to P_{cj}(y_1, \ldots y_k) & \text{if } s = s':p, \text{ for some } s' \in S \text{ and} \\ & \text{predicate } p \notin U, \\ s' \to r \to P_{cj} & \text{if } s = s':p, \text{ for some } s' \in S \text{ and} \\ & \text{predicate } p \in U, \\ s \to r \to P_{cj}(y_1, \ldots, y_k) & \text{otherwise.} \end{cases}$$

where the function state (p) represents the predicate p in terms of the corresponding state variables (as defined in Step 3 of Algorithm 2).
The process Q (s, r, $c_j$, ($y_1, \ldots, y_k$)) is defined in terms of the following three cases:
Case 1 (Defined predicates): The stimulus s is an abstract stimulus of the form s=s':p, where s' is some stimulus in S and p is a defined predicate (i.e. p∉U). The resulting CSP process is defined according to Step 3 (Case 1) of Algorithm 2.
Case 2 (Undefined predicates): The stimulus s is an abstract stimulus of the form s=s':p, where s' is some stimulus in S and p is an undefined predicate (i.e. p∈U). The resulting CSP process captures this undefined element by ignoring it (as opposed to constructing a guard) and simply extracting the stimulus s' as the initial event offered followed by the corresponding response event r.
Case 3 (No predicates): The stimulus s does not involve predicates and therefore results in the standard CSP definition as defined in Algorithm 1.
5. (Same as Step 4 in Algorithm 2) The CSP process $P_{BB}$ is then defined as follows:

$$P_{BB} = P_{c0}(I_1, \ldots, I_k)$$

where $c_0$ represents the shortest canonical sequence ◊ and $I_1, \ldots, I_k$ are the initial values of each state variable respectively. These initial values are derived directly from the definitions of the specification functions.
Algorithm 4: Translating State Boxes into CSP
The state box specification is the next step towards implementation in the box structure development method and is derived from the black box specification. It captures the stimulus history as state data, such that the external behaviour remains the same as defined in the black box specification. A state box of a given component (or system) defines a state box function SB from an old state and stimulus to a corresponding new state and response (SB: (Q×S)→(Q'R), where Q is the set of possible states, S is the set of stimuli and R is the set of responses). Once such state data is introduced, there is no longer the need to make reference to stimulus history (as was the case for black box specifications).
There is one state box defined for each stimulus s∈S of the form:

| Current State | Response | New State | Trace |
| --- | --- | --- | --- |

Algorithm 4 below presents a possible implementation for translating state box specifications into corresponding CSP models. For the purposes of clarity (and as done for Algorithm 1), the information presented in a state box for a stimulus s∈S is captured as the set $\text{Rows}_{SB}$ (s), comprising one element per row of the state box table: For a given stimulus s∈S, the set $\text{Rows}_{BB}$ (s) is defined as a set of triples containing one triple (q, r, q') for each row in the state box table for s, where q is the current state, r is the response and q' is the new state. For example, consider the following state box table for some stimulus s:

| Current State | Response | New State | Trace |
| --- | --- | --- | --- |
| $q_1$ | $r_1$ | $q_2$ | ... |
| $q_3$ | $r_2$ | $q_4$ | ... |
| $q_5$ | $r_3$ | $q_6$ | ... |

Then $\text{Rows}_{SB}$ (s) would be defined as the following set:

$$\text{Rows}_{SB}(s) = \{(q_1, r_1, q_2), (q_3, r_2, q_4), (q_5, r_3, q_6)\}$$

FIG. 16 illustrates an example of a state box table for some stimuli s and its corresponding set $\text{Rows}_{SB}(s)$.
Algorithm 4: Given a state box specification for some state box function SB: (Q×S)→(Q×R), a corresponding CSP process $P_{SB}$ is defined as follows:
1. Let $x_1, \ldots, x_k$ denote the state variables as defined by the state box specification.
2. The process $P_{SB}$ is defined as follows:

$$P_{SB} = P_{SB}'(\text{init}_1, \ldots, \text{init}_k)$$

where $\text{init}_1, \ldots, \text{init}_k$ are the initial values of the state variables. These initial values are derived directly from the definitions of the corresponding specification functions.
3. The process $P_{SB}'$ is defined as follows:

$$P_{SB}'(x_1, \ldots, x_k) = \Box\{Q(s) | s \in S\}$$

There is one Q (s) per state box for stimulus s.
4. For each stimulus s∈S, Q(s) is defined as follows:

$$Q(s) = \Box\{Q'(q, s, r, q') | (q, r, q') \in \text{Rows}_{SB}(s)\}$$

where $$Q'(q, s, r, q') = q \,\&\, s \to r \to P_{SB}'(q')$$

Figure 17:
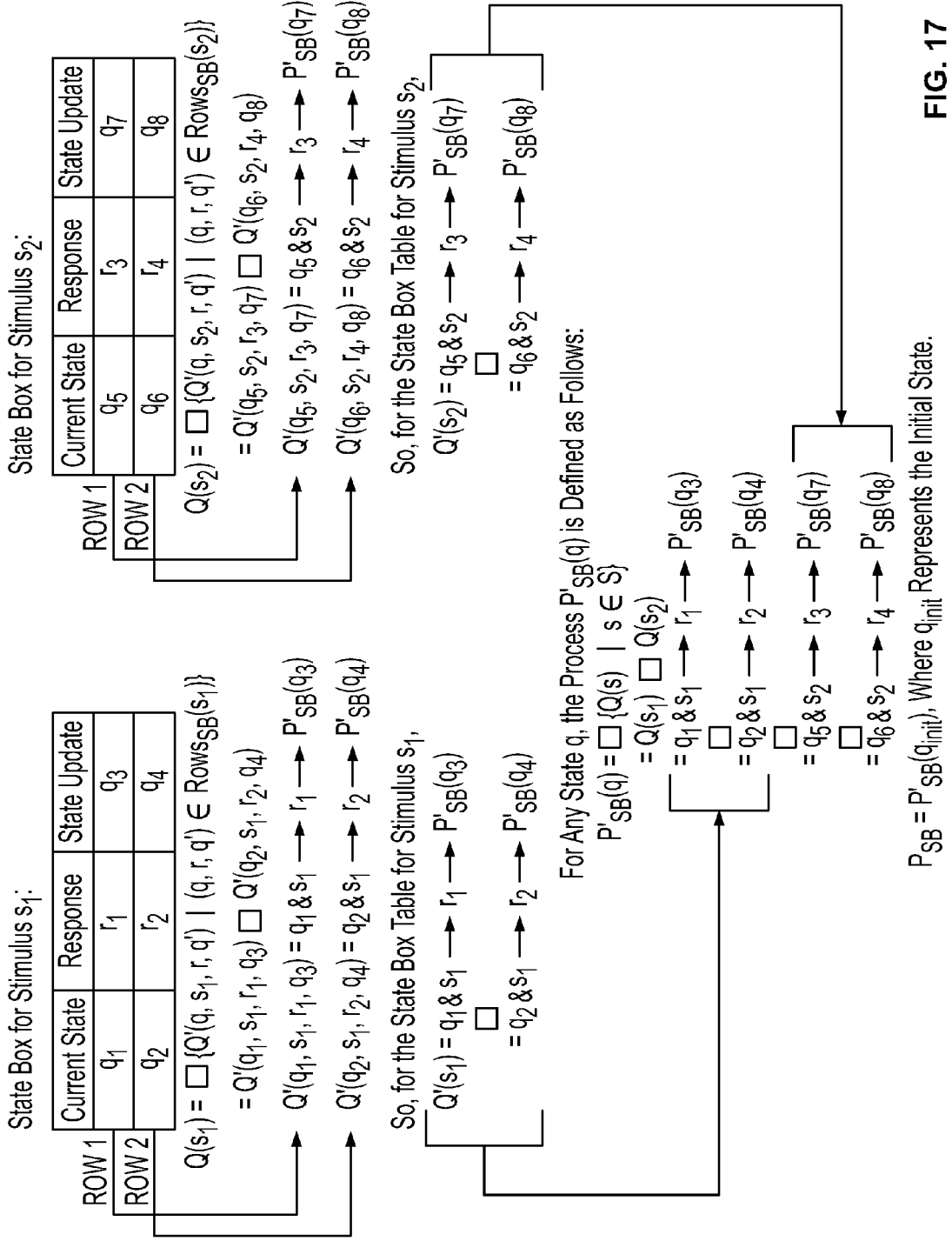
FIG. 17 is a table illustrating an example of the present application of Algorithm 4 to state box tables and generating the corresponding CSP process $P_{SB}$.

For a stimulus s, there is one process Q' (q, s, r, q') for each row in its state box. The value of q reflects the precondition for which s invokes response r and state update q', and is modelled as a Boolean guard in CSP.
FIG. 17 illustrates an example of the application of Algorithm 4 to a pair of state box tables, there being one table for each stimulus $s_1$ and $s_2$. The diagram illustrates the CSP equations corresponding to each state box table and how these are combined to form the CSP model for the complete state box.
Having described the background to understanding how the Model Generator 106 works, the Model Verifier 110 is now described in greater detail with reference to FIGS. 11 and 13. The model verifier 110 comprises a processing module 120 that inputs mathematical models 116, 118 of the Formal Design Specifications, Formal Interface Specifications and Formal Implementation Specifications as generated and stored (not shown) in data files by the Model Generator 106 and verifies them for correctness.

Figure 11:
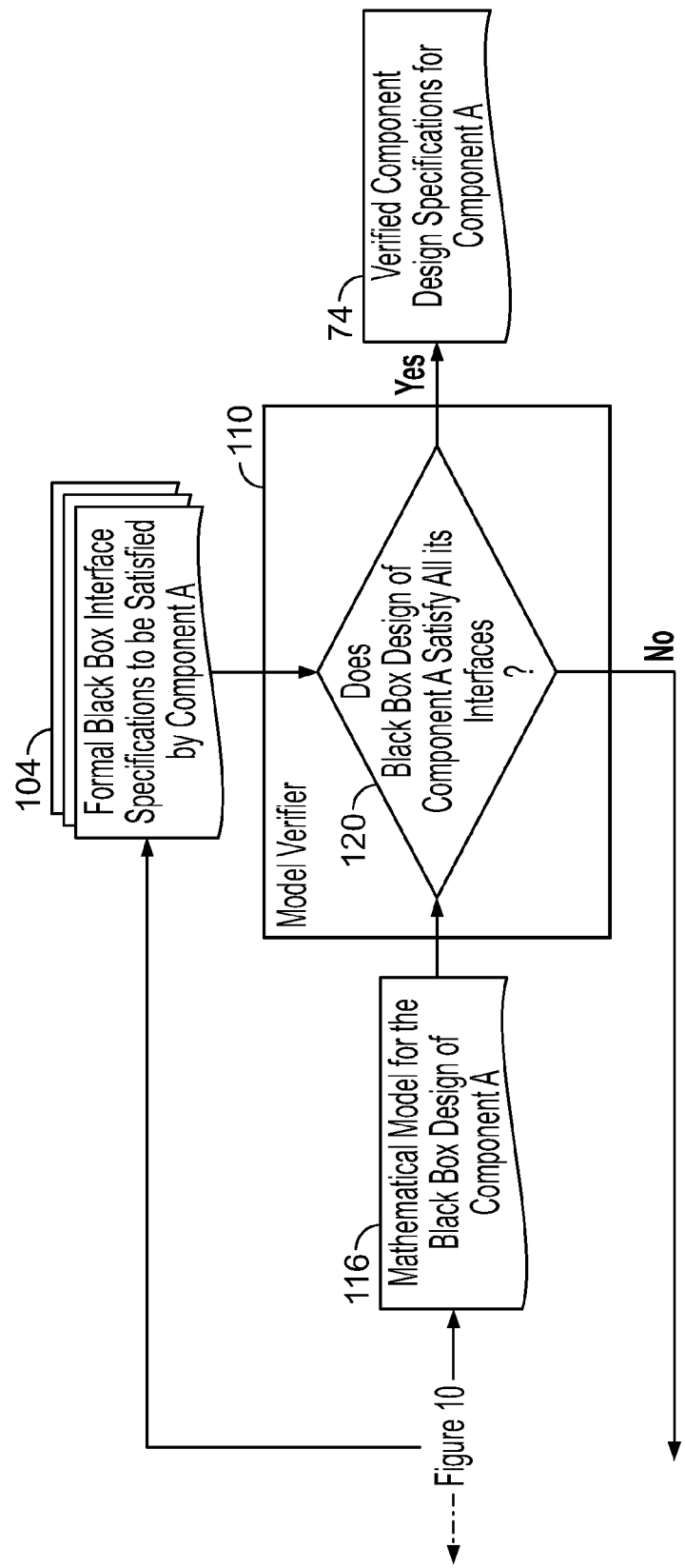
FIG. 11 is a schematic block flow diagram showing a more detailed overview of a process for formally verifying whether the design specification of a Component A satisfies all necessary interface specifications using the first embodiment of FIG. 7.
Figure 13:
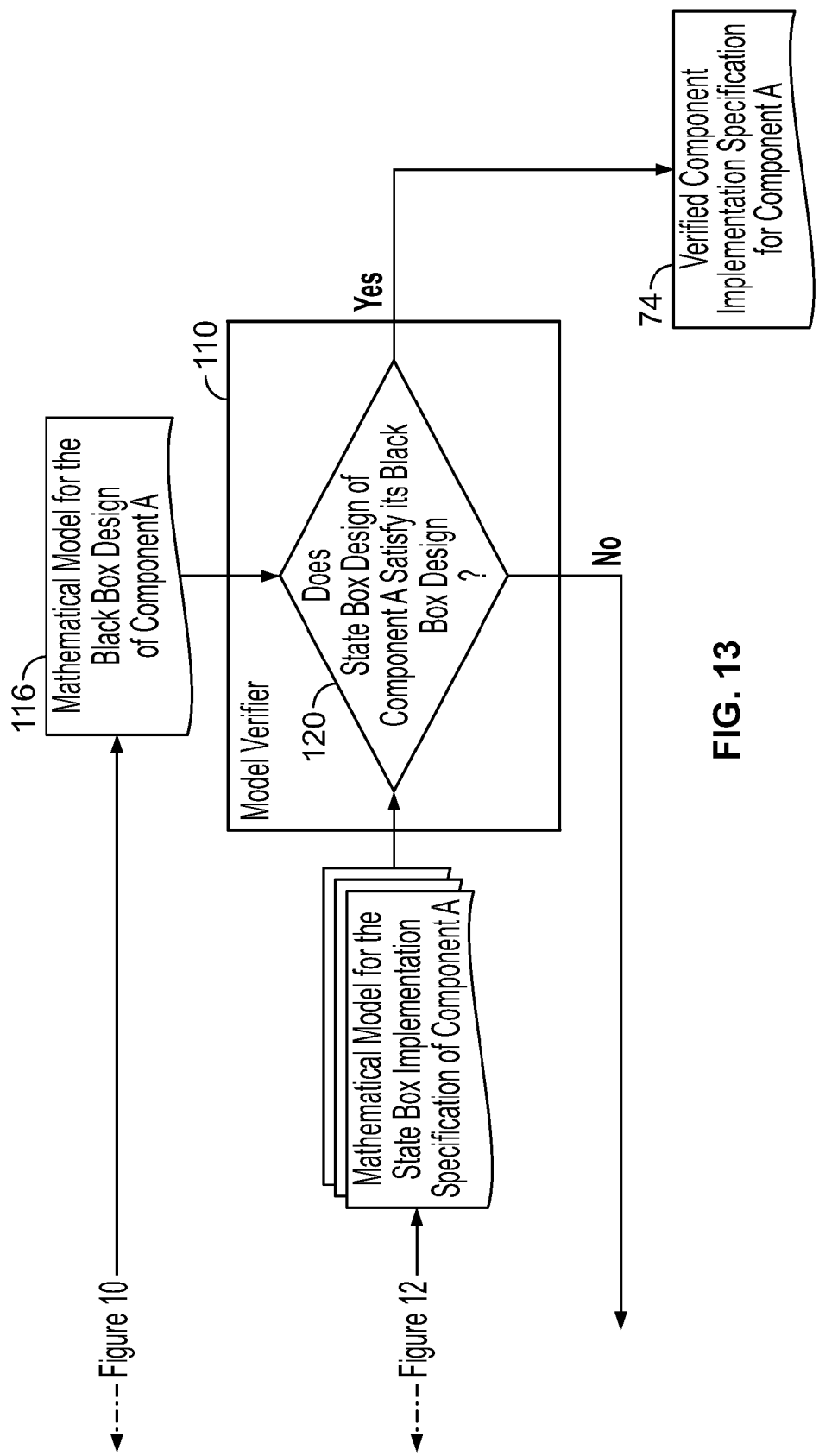
FIG. 13 is a schematic block flow diagram showing a more detailed overview of a process for formally verifying whether the state box specification of a Component A satisfies the corresponding black box specification using the first embodiment of FIG. 7.

The following standard correctness verifications are performed:
1. The models 118 of the Formal Component Interface Specifications are verified to ensure they are free from deadlocks and divergences and comply with any control laws derived from the Verified Requirements Specifications 66.
2. The models 116 of each of the Formal Component Designs are verified together with the models 118 of their respective component interfaces, models 108 of all other component interfaces which they use and models of any control laws derived from the Verified Requirements Specifications 66. This is to ensure that for each component (i) the component design implements all the behaviour and only the behaviour specified by the component's interface specifications; (ii) all other components used by the component design being verified are used according to their respective component interface specifications and that no actions defined as illegal by those interface specifications are performed; (iii) the component designs preserve any control laws derived from the Verified Requirements Specifications 66; (iv) the component design is free from nondeterminism, deadlocks and divergences when interacting with all the other components with which it interfaces and Interacts. This verification carried out by the processing module 120 of the model verifier 110 as depicted in FIG. 11.
3. For those parts of the software that must be programmed by hand and for which detailed implementation specifications are required, models 108 of the designs (in the form of Black Box Specifications) and models 108 of the detailed implementation specifications (in the form of State Box Specifications) are verified to ensure that they are exactly equivalent and that the detail implementation specifications are therefore error free. This verification carried out by the processing module 120 of the model verifier 110 as depicted in FIG. 13.

The correctness verifications described above and in the following sections are not an exhaustive list; they are representative of correctness verifications that will usually be required in most cases. The present embodiment is described on the basis that any correctness verification that can be expressed in the chosen process algebra and its associated model verifier 110 can be formulated and applied as needed as will be apparent to the skilled addressee.

In general, the verifications are an iterative process. Models 108 are generated by the Model Generator 106, the Model Verifier 110 discovers errors in the Interfaces and designs being modelled and verified and these are brought to the attention of the software design experts. They then correct those interfaces and designs, and the system then generates new models and attempts to verify them again.

At each stage of the box structure development method 112 for a component's design, once the specification is modelled in CSP, properties such as completeness, determinism and compliance with control laws specified in the system's requirements (for example, verifying that the vending machine never dispenses drinks without payment) can be formulated in CSP and automatically verified in FDR.

In the case of state boxes, when defining the characteristic predicates as state data, it is important to ensure that they correctly partition S*: they must be non-overlapping and complete. In practice, errors during this phase are frequently introduced. Both properties are easily checked in FDR. The first of these is captured by checking for nondeterminism; if there are overlapping predicates, then there will be a state where, for a given stimulus s, at least two guards evaluate to true, leading to a nondeterministic choice as to which of these is performed. To ensure that overlapping state predicates always result in nondeterminism, the CSP model is extended by introducing unique events immediately after every stimulus event. For example, $$P(x) = x \ \& \ s \to e_1 \to r_1 \to P(f(x))$$
$$\Box$$
$$x \ \& \ s \to e_2 \to r_2 \to P(g(x))$$
$$= x \ \& \ s \to (e_1 \to r_1 \to P(f(x))$$
$$\sqcap$$
$$e_2 \to r_2 \to P(g(x)))$$

where x is the (overlapping) state predicate derived in the state box, s is a stimulus, $r_1$ and $r_2$ are responses, g and f model the state updates, and $e_1$ and $e_2$ are the unique events inserted into the model. Nondeterminism is clearly introduced when x true. Without the extra events, overlapping predicates do not necessarily lead to nondeterminism; in the example above, if $r_1=r_2$ and $f(x)=g(x)$, then no nondeterminism is introduced. The Model Generator 106 generates the CSP model 108 with these extra events inserted to enable this property to be checked. Once checked, the models 108 are generated without these extra events for further analysis.

Each step in the box structure development method 112 is verified. Regarding black boxes and state boxes, it is important to verify that they are behaviorally equivalent. When in the prior art the BSDM method is used on its own in a software development process without using the ASD system of the present embodiment, such verification is done by deriving the black box behaviour from the state box and checking whether it is equivalent to the original black box specification. This is time consuming, error prone and economically infeasible in practice. The algorithms presented previously (Algorithms 1 to 4) allow both specifications to be translated into corresponding CSP models respectively and the necessary verification checks to be done automatically in FDR.

The behavioural equivalence between a sequence-based specification and a state box specification can be formulated in terms of the traces of the corresponding CSP processes: A deterministic sequence-based specification $Spec_{BB}$ and a deterministic state box specification $Specs_{BB}$ are behaviorally equivalent precisely when their respective CSP models $P_{BB}$ and $P_{SB}$ are traces-equivalent, written as $P_{BB} \equiv_T P_{SB}$. This is automatically checked using FDR. If the check fails, then FDR produces counter-examples.

The box structure development method 112 is component-centric in the development of designs; it addresses the designs of individual components without considering the behaviour of the system as a whole as comprised of its many components. Once translated into CSP, the interactions between components and the behaviour of the system can be analysed as a whole, by analysing their parallel composition and checking that they satisfy the system's specification. Properties such as deadlock freedom and compliance with control laws specified by the requirements are formulated in CSP and automatically verified in FDR. The compositionality property of CSP provides the scalability for such development in practice.

Verifying whether a component design fully implements exactly the behaviour specified in its interface specifications 104, amounts to verifying that the CSP model 108 of a sequence-based specification of a design is a refinement in the failures model of the CSP model 108 of a sequence-based specification of an interface. This verification is done automatically by FDR for divergence free non-deterministic interface specifications and deterministic component designs.

As has been mentioned previously the ASD Editor 91 is the processing module used by software architects and design experts. It is now described more fully below. The ASD Editor 91 provides functionality to support these users in the following activities:

1. Making the Formal Interface Specification 104 of a component interface using the Sequence-based Specification generator 100 to define the behaviour of the interface as an under-specified Black Box Function;
2. Making the Formal Design Specification 102 of a component using the Sequence-based Specification Generator 100 to define the behaviour of the component as a fully specified Black Box Function
3. Making the Formal Implementation Specification 114 of each part of the component for which the Program Source Code 82 cannot be generated automatically by the Code Generator 92 but instead must be programmed by hand. The Formal Implementation Specification 114 is made by applying the Box Structure Development Method 112 to specify the required design in the form of a State Box.
4. Annotating the Formal Design Specification 102 with the additional information needed by the Test Case Generator 96 to enable it to generate test cases 78 that are weighted by the probability of particular sequences of stimuli occurring. Such an annotated Formal Design Specification 102 is called a Usage Model.
5. Producing hard-copy printed outputs of the black box specifications and usage models in a tabular form and plotting them as directed graphs 79 representing the state machine behaviour of component interfaces and designs. These outputs 79 represent a means by which users can validate by manual inspection whether or not the black box specifications reflect the informal specifications 14, 18, 22 from which they are derived. In addition, printed outputs 79 of the state box specifications in tabular form are also produced.

The functions of the ASD Editor 91 are provided to its users via a set of user interfaces, there being one set for each of the major areas of functionality described above. The user interfaces are described below with reference to FIGS. 18 to 21 which show the four main types of user interface.

All of the specifications produced by means of the ASD Editor 91 are stored in the database (see FIG. 7) of the ASD system 62 in a form in which they can be reused and modified using the ASD Editor 91 and input to other parts of the ASD System 62. The embodiment of the present invention is disclosed with the storage being in the form of data files 93. It is also foreseen that other forms of computer storage such as a relational database could be used.

The ASD Editor 91 provides a set of user interfaces to all of the functions it provides. The present embodiment incorporates the user interfaces described below; however it is to be appreciated that other variations and user Interfaces are possible.

When specifying a component interface using the Sequence-based Specification Method to produce a Formal Interface Specification in the form of an under-specified black box, the following screens are presented to the user.

1. The Interface Screen 138 as shown in FIG. 18, which contains the following information:
    a) The name of the interface;
    b) A prefix with which the Model Generator 106 uniquely identifies every stimulus and response belonging to this interface;
    c) A list of all input stimuli that can be sent to the interface, specifying for each one a short abbreviated name, a brief description, a code describing how transitions caused by the stimulus are to be plotted (line colour, style etc.) and the method name to be used by the Code Generator for the method to be called when the stimulus is received;
    d) A list of responses that can be emitted by the interface 138, specifying for each one an abbreviated name, a brief description and the method name to be used by the Code Generator 92 when generating program source code of the corresponding response procedure.

This interface is described in greater detail by way of an example described later with reference to FIG. 18.

2. The Sequence Enumeration Screen 160 as shown in FIG. 19: this contains all the enumeration tables, there being one table per equivalence class of sequences of input stimuli, resulting from the Sequence-based Specification Method. Collectively, these tables define the total black box function specifying the behaviour of a component as it is visible at the interface.

Each table consists of:
a) A header row identifying the canonical sequence of the equivalence class;
b) A collection of rows, there being one or more rows per input stimulus.

The input stimuli are listed in the row collections in every table in the same order. In most cases, there is exactly one row for each input stimulus. There will be more than one row for a given stimulus if there is more than one possible outcome (i.e. choice of response and/or future system behaviour) that can result from the stimulus. In such a case, there is one row per possible outcome and each row is annotated by a predicate representing one of the possible cases. The predicates will be expressed in terms of expressions involving prefix recursive functions over the input sequences and every case must be covered. If the choice between outcomes is deterministic and known, the prefix recursive functions must be fully specified and defined; if the choice is not deterministic at the level of abstraction at which the interface is being expressed (i.e. it depends on events hidden by the implementation), then the prefix recursive functions are identified but not yet specified. The black box function remains under-specified.

Within each table, every row in the collection of rows has the following columns defined containing the following information:
a) Row sequence number—all rows in all tables are sequentially numbered with a single numbering sequence for the purposes of referencing them;
b) Stimulus—the abbreviated name of the input stimulus;
c) Predicate—a predicate as described above. The predicate may or may not be present in each row,
d) Response—the abbreviated name of the response emitted by the interface;
e) Equivalence class—the identification of the equivalence class corresponding to the future system behaviour after this stimulus;

f) A comment explaining and justifying the response and future system behaviour;

g) Requirements tags—references to tagged requirements in the informal requirements specification that justify the outcome after the stimulus.

This interface is described in greater detail by way of an example described later with reference to FIG. 19.

3. The Function Specification Screen (not shown): A specification of all prefix recursive functions used by the predicates. For those functions that cannot be specified in terms of input stimuli visible at this level of abstraction, the functions are identified and the possible function values specified without specifying the prefix recursive equations that define the function value.

4. The Derived Requirements Screen 180 as shown in FIG. 20 comprises a tagged list of requirements 182 missing from or incorrect in the informal requirements specifications. During sequence-based specification, it is common that choices must be made concerning issues about which the informal requirements specification is silent, inconsistent or incorrect. To resolve such issues, additional requirements or amendments are made and these are recorded and tagged in the Derived Requirements Screen 180. When the interface is completely specified and validated, the informal requirements are updated in accordance with the derived requirements.

This interface is described in greater detail by way of an example described later with reference to FIG. 20.

When specifying a component design using the Sequence-based Specification Generator 100 to produce a Formal Design Specification 102, in the form of a fully specified black box, the following screens are presented to the user:

1. The Interface Screen 138 which is the same as described above except that there will be one interface screen for each interface implemented or used by the component being designed.

2. The Sequence Enumeration Screen 160 which is the same as described above, except
   a. The set of input stimuli is the union of (i) all the input stimuli of all interface being implemented by the component, and (ii) for each used interface, the subset of responses to which the component must react.
   b. All prefix recursive functions referenced in any predicate must be fully specified to remove intentional nondeterminism.
   c. The resulting black box function must be deterministic; if it is not, this is a design error.
   d. Additional columns may be added to track the states of used components as an aid to the software design expert making the design.

3. The Canonical Analysis Screen 190 as shown in FIG. 21. This screen 190 has one row per equivalence class and each row has the following columns:
   a. The sequence number of the canonical sequence in the Sequence Enumeration Screen 160;
   b. The canonical sequence itself in the form of a comma separated list of input stimuli, with associated predicate if any;
   c. A symbolic name of the equivalence class that is used to annotate both the sequence enumeration tables and the plotted graphical representation of the corresponding finite state machine behaviour of the total black box function;
   d. One or more columns of system properties defined according to the Box Structure Development Method 112.

This interface is described in greater detail by way of an example described later with reference to FIG. 21.

4. The Function Specification Screen (not shown): The same as described above except that all of the prefix recursive functions referenced in any predicate must be fully specified to remove intentional nondeterminism.

5. The Derived Requirements Screen 180 which is the same as described above.

When specifying an implementation in the form of a State Box for those parts of the component for which the program source code cannot be generated automatically by the Code Generator 92, the following screens are presented to the user
1. The Sequence Enumeration Screen 160 which is the same as described initially above except that two additional columns are added, namely:
   a) For each row for which a predicate is specified, a column that contains the same predicate expressed in terms of state data items instead of prefix recursive functions over the input sequences;
   b) For each row for which a predicate is specified, a column that contains the specification of state data item updates.
2. The State Data Item Specification Screen (not shown). A screen that identifies and defines the type of every state data item and specifies the initial value.

When annotating a Formal Component Design Specification 102 to define a usage model as needed by the Test Case Generator 96 to generate test cases 78, the following screens are presented to the user
1. The Sequence Enumeration Screen 160 which is the same as described initially above, except that an extra column is added to enable, each outcome to be labelled with an estimated probability of occurrence.
2. The Test Program Generation Screen (not shown): This screen allows the user the specify three types of information used by the Component Test Case Generator for generating executable component test cases:
   a) The test case Code Prologue. This is a sequence of program code in the programming language in which the tests are to be generated. Every generated test program starts with this sequence.
   b) The test case Code Epilogue. This is a sequence of program code in the programming language in which the tests are to be generated. Every generated test program ends with this sequence.
   c) The Stimulus Code Map. This specifies for each input stimulus used in the design, the coding sequence to be generated in the test cases to Invoke the correct method on the interface to the component being tested.

Referring now back to FIG. 18, it can be seen that the interface screen 138 is divided into several sections as follows:

There is a Channels section 140, which lists the names of the communication channels 140 by which this specified component interacts with other components and the environment. In the example shown in FIG. 18, ISS and ISSCB are the names of channels representing parts of the Interfaces being implemented by the component being specified. This information is used by the Model Generator 106 when generating mathematical models 108 of the component's Interface and design.

A Queues section 142 is provided which identifies any queues 142 needed to correctly model asynchronous interface behaviour. A queue 142 is specified by (i) its name 143; (ii) its input channel name 144; (iii) its output channel name 145; and (iv) the queue length 146 (the number of entries it can hold). In the example shown in FIG. 18, one queue 142 is specified; the queue name is DPCQ the input and output channels are called DPCQin and DPCQout respectively and the queue length is 12.

This information is used by the Model Generator 106 when generating mathematical models 108 of the components interface and design. It enables the asynchronous nature of an interface to be correctly modelled automatically.

The interface screen 138 has a Bindings section 147 which specifies additional information needed by the Model Generator 106 in order to correctly generate mathematical models 108. The statements are written in the chosen modelling language, in this embodiment they are expressed in the machine readable form of CSP called $CSP_m$. The specified statements are emitted as part of the generated output without change. In this example none are shown.

A further Implemented Interface section 148 is provided. This section defines the set of interfaces implemented by the component being specified. In the example in FIG. 18, the interface 148 is called ISubStage and this is implemented by the design specified in the sequence enumeration table called ISubStage. The purpose of this section is to define the stimuli and responses passing across the implemented interface.

Each stimulus and response is defined by a single row in the table shown as part of the Interface screen 138. The meaning of the columns shown on the screen is as follows:

Leftmost Column 149: A brief description of the stimulus or response. This is for the convenience of the human user of the ASD Editor 91; it has no meaning to the ASD system or the ASD Editor 91 and can be any free text.

Stimuli Column 150: If the row defines a stimulus, this column contains its name prefixed by its channel.

Response Column 151: If the row is defining a response, this column contains its name prefixed by its channel.

There are three responses which have predefined reserved names and are used with predefined meanings. These meanings and names are part of the ASD system and cannot be changed. They are (i) Null used in those cases where a stimulus has no visible response to represent the absence of a response; (ii) Illegal used to identify sequences of input stimuli that are meaningless or cannot occur by design; (iii) Blocked—this is used to identify sequences which are not observable in a particular situation. It has similar semantics as Illegal except that the stimulus and the response are both omitted from the generated mathematical models.

Plot Column 152: This column is used to control the appearance of the plotted representation of the design. It is used to specify the colour and line style of transition lines on the plotted output.

In the FIG. 18 example, stimuli and responses have been grouped together and separated by titles to increase the clarity of the specification. The ASD Editor 91 allows complete freedom in this respect.

In addition to the implemented interface, there is a used interface section 153. That is, interfaces used by the component being specified but not implemented by it. Each used interface 153 is defined in the same manner as the implemented interface, in terms of the stimuli and responses passing across it.

Referring back to FIG. 19, the Sequence Enumeration Screen 160 is used to define the externally visible functional behaviour of a Component Interface and the designed behaviour of a Component Design. The screen 160 displays a table which is divided into a number of sections, there being one section for each Canonical Sequence that results from applying the Sequence-based Specification Method. Each section is preceded by a header line 161 containing the identification and specification of the Canonical Sequence to which the section applies. The header line is specified in a user-selected contrasting colour for clarity.

Each section specifies the single stimulus extension of the Canonical Sequence plus all other sequences in the same equivalence class. Within each section, there are one or more rows for every stimulus.

Each row consists of the following information:

No. Column 162: this column is the row sequence number referred to previously.

Stimulus Column 163: this is the input stimulus referred to previously.

Predicate Column 164: this column contains the predicate referred to previously.

Response Column 165: this is the response referred to previously.

State Update Column 166: this column relates to a modification of the present embodiment which can be incorporated in a further embodiment. The column 166 contains updates to the predicates to reflect the state of the system after any of the sequences represented by the row. This variation is described below.

Equ Column 167: this is the equivalence class referred to previously.

Comments Column 168: this column contains the comments referred to previously.

Tag Column 169: this column contains the requirements tags referred to previously.

The example shown in FIG. 19 shows the first two sections of a Component Design. Note that the organisation, layout and appearance of the tables is important in describing the interface rather than the particular contents which are merely provided as an illustrative example data. A Component Interface Specification has the same layout and structure.

Referring back to FIG. 21, the Canonical Analysis Screen 190 has a format and layout which is part of the ASD Editor user interface but the contents are example data given for purposes of illustration only. More specifically, the Canonical analysis Screen 190 comprises:

A Leftmost Column 192: this corresponds to the sequence number as specified previously.

A Canonical Sequence Column 194: this corresponds to the canonical sequence as specified previously.

A State Name Column 196: this corresponds to the symbolic name of the corresponding equivalence class as specified previously.

Property 1 and Property 2 Columns 198: one or more columns, each of which contains one of the system properties as specified previously. In the Screen shown in FIG. 21, two columns are shown which is exemplary only; the number of columns and the names of the columns are specified by the ASD Editor user and are specific to each individual Component Specification.

A variation of what has previously been described in relation to the Sequence Enumeration Screen 160, is now described as part of a different embodiment. In the first embodiment, the use of prefix recursive functions over the input sequences as a means of specifying predicates associated with sequences of input stimuli was been described. It was originally mentioned that a Function Specification Screen was part of the ASD Editor 91 for specifying these functions.

In practice, this turns out to be very difficult for the Model Generator and Code Generator to generate the appropriate mathematical models and source code representing the behaviour of the prefix recursive functions. Instead, as an extension to the first embodiment application, state variables are used in the predicate specifications. This means that there is a way of specifying the effect of a sequence of stimuli on the values of these state variables. By this means, the same effect is achieved as using prefix recursive functions but enable the Model Generation to be carried more easily.

The effect of this can be seen in the Sequence Enumeration Screen 160 shown in FIG. 19. The Predicate Column 164 contains predicate expressions using state variables. The State Update Column 166, is used to specify the new values of the state variables as a consequence of the sequences of input stimuli. Finally, the state variables must have defined values after the empty sequence. This is accomplished by specifying them in the header line 161 of the first section of the table. This is the section that corresponds to the empty Canonical Sequence.

This modification of the first embodiment has the following benefits:
1. Most software engineers find the use of state variables in predicates more intuitive and easier than defining prefix recursive functions;
2. It makes Model Generation more straightforward;
3. It makes Code Generation easier.

In addition, it means that the Sequence Enumeration Screen 160 mentioned previously has the same format as that used above.

A further modification is that the EQU column 167 is colour coded by the ASD Editor 91 to help the user to distinguish between different cases.

The Component Test Case Generator 96 takes as input the Usage Models in the form of the data files 93 stored by the ASD Editor 91, generates the necessary component test cases 78 and analyses the test results. It is comprised of the following processing modules:
1. A Test Sequence Generator (not shown) that generates a set of test cases in the form of sequences of input stimuli with the expected responses, statistically weighted according to the Usage Model according to the principles described in [PTLP98]. In the present embodiment, the Usage Models are recorded in the TML language as described in [PRO00] and the Test Sequence Generator functions as the program JUMBL as specified in [PRO03].
2. A Test Program Generator (not shown) that takes as input the test cases generated by the Test Sequence Generator and generates the test programs corresponding to each test case. In the present embodiment, the test cases are generated in the form of individual computer programs, each of which corresponds to one of the test cases generated by the Test Sequence Generator. Any suitable programming language can be chosen; the program code sequences are generated according to the sequences input using the ASD Editor 91 and stored as part of the Usage Model. For each test case, the test program is generated as follows:
   a. The Code Prologue (see above) is generated.
   b. For each input stimulus in the test case, the code-sequence specified in the Stimulus Code Map (see above) is generated.
   c. After the last input stimulus code sequence, the Code Epilogue (see above) is generated.
3. A test oracle (not shown) that takes as input data files generated by the test programs as they execute and which record the results of the test and analyses the results in order to determine whether the test succeeded or failed and computes statistics as to the progress of the testing and probable reliability of the component being tested. In the embodiment of the present invention, this analysis is performed by the program JUMBL specified in [PRO03].

A set of computer programs which when compiled and made ready for execution by a computer and which implement the state machine behaviour of a component is called an executable state machine. An executable state machine has three parts:

An execution environment which determines how the executable state machine receives input stimuli. It is system and implementation-specific and it is independent of any particular state machine being implemented. It is designed and programmed by hand in the usual way, possibly making use of reusable components. Its function is to provide the input stimuli in the correct order to cause the state machine to operate as specified in the Verified Component Design Specification 70.

This program code is not generated by the Code Generator 92.

A set of response procedures, there being one response procedure for each response r∈R and each of which implements one of the responses in R.

This program code is developed by hand on the basis of the Verified Component Implementation Specifications 74.

This program code is not generated by the Code Generator 92.

An implementation of the state machine which, given a stimulus, invokes the corresponding response procedure and executes the state transition function in accordance with its design as specified by the Verified Component Design specifications 70.

All of this code is generated automatically by the Code Generator 92 from the Verified Component Design Specification 70.

The Source Program Code 82 that implements the state machine behaviour can be generated in any programming language. The present embodiment generates Source Program Code in C++ and C; other programming languages such as JAVA or ADA could equally well be used.

The algorithm (not shown) for generating the Program Source Code in C++ is as follows:
1. Generate the definition of an abstract base class State with one pure virtual method defined for every stimulus s∈S. The signature of every method must include the return value of type reference to State.
2. Generate the definition of a class called Context to represent component state and which holds state data variables needed to maintain the values of the various predicates. For every such item of data, define a suitably named data member and a pair of assessor methods for retrieving and updating the data member values. For every such predicate, define a suitably named Boolean function that returns the value of the predicate.
3. For each canonical sequence $C_i$, generate the definition of a concrete subclass of abstract class State, called $State_i$, all instances of which provide an implementation for every pure virtual method in the abstract base class State. The purpose of each method is to (i) evaluate any predicates using the state data encapsulated in the Context class and determine the appropriate response function to be invoked and the successor state; (ii) invoke the response function; (iii) capture any state data updates in Context necessary to evaluate predicates in the future; and (iv) return a reference to the successor state. State data is retrieved and updated via the assessor methods implemented in Context class.

A similar approach can be taken for generating source code for other object oriented languages such as Java.

For procedural languages, such as C, a different approach is needed. One such algorithm is to generate a module that encapsulates all the state behaviour. The characteristics of the generated module are as follows:

1. The module defines static local data variables to hold the state data required for evaluating predicates. One special state data item is called currentState and is used to identify the canonical sequence corresponding to the equivalence class of input sequences of stimuli already input
2. For each of the predicates, the module defines a suitably named Boolean function that evaluates the predicate and returns its value.
3. The module defines one procedure for every stimulus s∈S. The procedure names have global scope and the execution environment must invoke the procedure that corresponds to each stimulus as it occurs. The purpose of these procedures is to delegate actual processing to a stimulus procedure $P_{ij}$ designed to carry out the necessary actions for stimulus $s_i$ after any sequence in the equivalence class identified by canonical sequence CJ;
4. For each stimulus $s_i$∈S and each canonical sequence $C_j$, the module contains a local stimulus procedure $P_{ij}$ to execute the actions defined for stimulus $s_i$ after any sequence in the equivalence class represented by $C_j$. Each such procedure must (i) evaluate any predicates based on state data values; (ii) invoke the appropriate response procedure; (iii) perform any necessary state data updates; and (iv) return a value representing the equivalence class to which the newly formed sequences belong.

A similar approach can be taken for any procedural programming language.

In order to assist component testing, the Code Generator optionally generates additional diagnostic program statements that record the stimulus being processed and the response generated in the form of a data file that can be input by the test oracle in order to analyse the results of component tests.

A second embodiment of the present invention is now described with reference to FIGS. 22 to 25. More specifically the second embodiment is very similar to the first embodiment and therefore for the sake of conciseness only the differences between the embodiments will be discuss in any detail hereinafter.

In the previous embodiment, the Verified Black Box Specification Generator 90 was responsible for generating black box specifications for the following:

1. A Functional Interface Specification of the component being designed (referred to below as the CBD);
2. A Component Specification and Design of the CBD;
3. Functional Interface Specifications for every other component with which the CBD interacts.

As described in the first embodiment, this enables the CBD design to be verified for correctness both with respect to its own Functional Interface Specification and with respect to the Functional Interface Specifications of those other components with which it interacts. These used components (referred to below as UCs) can be implemented in software or hardware or some combination of both.

Where the UCs have been or will be developed not using the ASD system 62, for example because they already exist or are to be supplied by a different organisation or project team using conventional development methods, their correctness of with respect to their Functional Interface Specifications cannot be guaranteed by using the ASD system 62 to develop the CBD. The possibility therefore exists that the Functional Interface Specifications of one or more of the UCs may differ from the actual implemented behaviour. This is important because the design of the CBD is verified against these Functional Interface Specifications and not against the UCs' designs or implementations.

In practice this means that defects in the implemented system caused by differences between a UC's Functional Interface Specification and its actual implementation can remain undetected until Integration Testing. In order to isolate and detect such defects, the ASD System 62 of the second embodiment is extended to include the new concepts of Interface Protocol Verifiers 206 and an Interface Protocol Verifier Generator 208 (FIG. 25).

Figure 22:
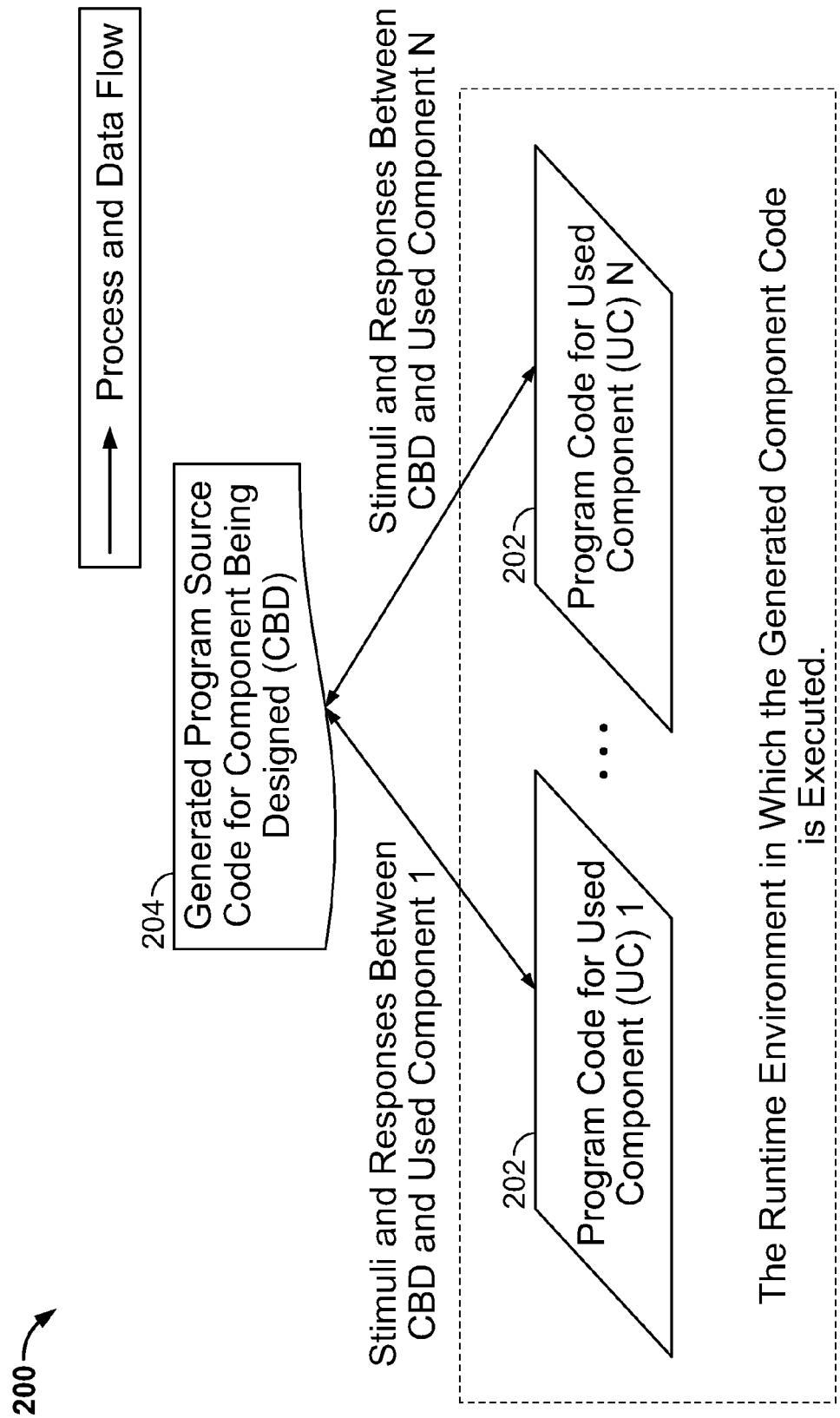
FIG. 22 is a schematic block diagram illustrating the process of executing generated source code for a Component Being Designed (CBD) within its runtime environment consisting of all the other components with which it interacts.

Referring now to FIG. 22, there is shown an execution architecture 200 of a CBD together with a number of UCs 202 with which it interacts. The design of the CBD has been verified as correct under the assumption that each UC correctly implements the behaviour specified by its Verified Component Interface Specification 72, and the CBD program code 204 has been generated from this verified design.

As shown in FIG. 23, an Interface Protocol Verifier 206 is a software-processing component that is inserted between the CBD 204 and a UC 202. Its purpose is to observe all interactions from the CBD 204 to the UC 202 and from the UC 202 to the CBD 204 and verify the interactions between them are according to the Verified Component Interface Specification 72 of the UC 202.

It is not necessary to verify that the CDB 204 interacts correctly with the UC 202 in accordance with the UC's Verified Component Interface Specification 72 because this is already mathematically verified by using the ASD System 62 to design and implement the CBD. The purpose of an Interface Protocol Verifier 206 is to detect any differences between the observed UC behaviour and its Verified Component Interface Specification 72 and to provide diagnostic information (not shown) to enable these differences to be analysed and corrective actions to be taken. Note that this is not necessary if the UC has been developed using the ASD System 62; in that case, its design will have been mathematically verified as been correct with respect to its Functional Interface Specification.

Each Interface Protocol Verifier 206 is a processing module generated from a Verified Component Interface Specification 72 by the ASD Interface Protocol Verifier Generator 208. The generated processing module 206 implements a state machine (not shown) that represents the specified behaviour of the component interface for which it is generated. When the system is executing, every interaction from the CBD 204 to the UC 202 via this interface is intercepted by the Interface Protocol Verifier 206 and passes via its state machine to the UC 202 implementing the interface. On each interaction from the CBD 204, the Interface Protocol Verifier 206 updates its state machine according to the Verified Component Interface Specification 72 to reflect this interaction and forwards it to the implemented UC 202.

Every interaction from the UC 202 directed towards the CBD 204 is similarly intercepted by the Interface Protocol Verifier 206 and validated against the Interface Protocol Verifiers state machine. If it is allowed, according to the Interface Protocol Verifier's current state, then the interaction is forwarded to the CBD 204. Otherwise, diagnostic information is logged and optionally, system execution is halted.

Each generated Interface Protocol Verifier 206 can be configured during generation to retain during execution a trace of a specified number of the most recent interactions from the CBD 204 and the UC 202 to aid in diagnosing the error.

The Interface Protocol Verifier 206 remains in place during integration and system testing and can be removed afterwards or left in place permanently to provide continuous monitoring of the other component's behaviour.

Because an Interface Protocol Verifier 206 is specific to a given component interface, one such verifier 206 is generated for each UC interface.

The Interface Protocol Verifier Generator 208 shown in FIG. 25, is a processing module which is a modified version of the ASD Code Generator 92. It takes as input the Verified Component Interface Specification 72 of a UC 202 in the form of a Verified Black Box Specification and generates an Interface Protocol Verifier 206 in the form of a software processing module written in a suitable programming language.

A common cause of defects in software systems developed using conventional methods is that used components (UCs) do not behave according to their Verified Component Interface Specifications. It is frequently the case that there is uncertainty concerning UC behaviour.

This leads to a class of defects that cannot be detected until integration and system testing has started and which are extremely difficult to detect and remove.

The technical benefit of this embodiment is to enable the system to detect and identify such defects more efficiently than in conventional software design practice and to provide detailed information concerning the defect's cause. Combined with the rest of the ASD System 62, this leads to more efficient and more certain defect removal as compared to other development methods. If it is determined that the UC 202 behaves differently from its Functional Interface Specification and that this behaviour is deemed to be the correct behaviour, using the ASD System 62 of the second embodiment, the problem is addressed as follows:

1. Using the ASD Editor 91, the component's Functional Interface Specification is updated to reflect the actual observed behaviour and a new specification is produced using the ASD Verified Black Box Specification Generator 90. The ASD Model Generator is used to generate a new mathematical model 108 of the modified interface from the newly generated Verified Component Interface Specification 72.
2. Using the ASD Model Verifier 208, the CBD design is verified for correctness against these changes. As necessary, the CBD design is modified to reflect this changed behaviour, new mathematical models are generated using the ASD Model Generator 106 and the design changes are verified using the ASD Model Verifier 110. This cycle is repeated as necessary until the modified CBD design is verified as correct.
3. The ASD Code Generator 92 is used to generate the program code for the modified CBD design.
4. The ASD Interface Protocol Verifier Generator 208 is used to generate a new Interface Protocol Verifier according to the changed interface.

The present embodiment has an additional output of the ASD System as compared to the first embodiment. This additional output is an Interface Protocol Verifier for one or more UCs as is shown on FIGS. 24 and 25.

The second embodiment incorporates an improved ASD Editor 91 which has many more editing functions. The ASD Editor 91 is extended to provide the following functions:

Insert Line: an empty, correctly formatted and sequence number line is inserted into the Sequence Enumeration table at the designated point.

Insert Response: the ASD Editor 91 presents a list of all responses defined in the Interface Screen 138 and lets the user choose one or more of them. These responses are inserted into the Sequence Enumeration table (screen 160) at the designated point in the specified order.

Insert Stimulus: the ASD Editor 91 presents a list of all stimuli 150 defined in the Interface Screen 138 and lets the user select one or more of them. For each selected stimulus 150, a new line is inserted at the designated place in the tables in the specified order.

Define New Canonical Sequence: when applying the Sequence-based Specification Method to construct sequence enumeration tables, new Canonical Sequences will be discovered and identified. Each of these requires its own section in the Sequence Enumeration Tables (Screen 160). The ASD Editor 91 computes the new Canonical Sequence 194, determines where the new corresponding section must be inserted in the tables and inserts a new section, the values of which are copied from the first section in the table. A reference to this selected Canonical Sequence 194 is inserted into the Equ Column 167 in the Sequence Enumeration tables (Screen 160) at the designated row.

Define New Canonical Sequence From: this is a variation of the function described immediately above. Instead of inserting a new section created by copying the values from the first section, the ASD Editor 91 presents a list of all currently defined Canonical Sequences 194 and lets the user choose one of them. The new section is created by copying the section corresponding to the Canonical Sequence 194 selected by the user. A reference to this selected Canonical Sequence 194 is inserted into the Equ Column 167 in the Sequence Enumeration tables (Screen 160) at the designated row.

Link to Existing Canonical Sequence: when the future system behaviour is the same as behaviour already defined, the user must specify the Canonical Sequence 194 to which the future behaviour is equivalent. The ASD Editor 91 displays a list of all Canonical Sequences 194 already defined and the user selects the with the same future system behaviour. A reference to this selected Canonical Sequence 194 is inserted into the Equ Column 167 in the Sequence Enumeration tables (Screen 160) at the designated row.

Sort Canonical Sequences: editing the Sequence Enumeration tables can result in redefinitions of Canonical Sequences 194 with the consequence that the corresponding sections in the table are out of order. The ASD Editor 91 will regenerate all Canonical Sequences 194 to ensure that they are the minimal length sequence in their respective equivalence class and then sort the table sections so that they reflect the length order of the Canonical Sequences 194.

Having described particular preferred embodiments of the present invention, it is to be appreciated that the embodiments in question are exemplary only, and that variations and modifications, such as those which will occur to those possessed of the appropriate knowledge and skills, may be made without departure from the spirit and scope of the invention as set forth in the appended claims. For example, it is possible to vary the implementation of CSP models as below.

One implementation has been of how a CSP process can be constructed for capturing a black box function. There are other modelling approaches regarding, for example, how the stimuli and responses can be represented as events and optimizations of the process definitions.

There are many variations possible on how to implement the specification functions that are used to define predicates over the input stimuli.

Alternative ways of representing the black box function to the enumeration tables style used here are also possible. For example, these could be presented as Mealy machines. It would also be possible to accommodate variation in modelling languages/formalisms which can be used for implementing the formal analysis. Also variations in programming languages generated by the Code Generator are possible and are variations in the user interfaces of the ASD Editor 91.

BIBLIOGRAPHY

[For03] Formal Systems (Europe) Ltd. *Failures-Divergence Refinement: FDR2 User Manual*, 2003. See http://www.fsel.com.
[Hoa85] C. A. R. Hoare. *Communicating Sequential Processes*. Prentice Hall, 1985.
[Mil88] H. D. Mills. Stepwise Refinement and Verification in Box Structured Systems. *Computer*, 21(6):23-26, 1988.
[MLH86] H. D. Mills and R. C. Linger and A. R. Hevner. *Principles of Information Systems Analysis and Design*. Academic Press, 1986.
[PP03] S. J. Prowell and J. H. Poore, Foundations of Sequence-Based Software Specification. *IEEE Transactions of Software Engineering*, 29(5):417-429, 2003.
[Pro00] S. J. Prowell, T M L: A Description Language for Markov Chain Usage Models. *Information and Software Technology*, 42(12):835-844, September 2000.
[Pro03] S. J. Prowell, JUMBL: A Tool for Model-Based Statistical Testing. In *Proceedings of the 36th Hawaii International Conference on System Sciences (HICSS'03)*, 2003.
[PTLP98] S. J. Prowell, C. J. Trammell, R. C. Linger and J. H. Poore, *Cleanroom Software Engineering—Technology and Process*. Addison-Wesley, 1998.
[Ros94] A. W. Roscoe, *Model-Checking CSP*. A Classical Mind: Essays in Honour of C. A. R. Hoare, pages 353-378. Prentice-Hall, 1994.
[Ros98] A. W. Roscoe, *The Theory and Practice of Concurrency*. Prentice Hall, 1998.

The invention claimed is:

1. An analytical software design system comprising:
a verified black box specification generator including a processor arranged to enable received informal design specifications of a software system to be developed for each component of the software system into:
(i) formal design specifications representative of a fully-specified black box function; and
(ii) formal interface specifications representative of an under-specified black box specification of required run-time interface behavior which captures non-deterministic behavior present at respective interfaces of the each component with all other components with which the component interacts,
wherein the verified black box specification generator is arranged to test correctness of the formal design specifications and the formal interface specifications and to generate verified design specifications;
the verified black box specification generator comprising:
input screen units for capturing the formal specifications as sequenced-based specifications using input screens, in which input entries of the input screens each identify a stimulus, a response and an equivalence;
a model generator arranged to generate automatically, for each of the components, a mathematical model of run-time system behavior for the component with all other components with which the component interacts from the formal design specifications and the formal interface specifications expressed in the input screens; and
a model verifier arranged to analyze the mathematical models to determine if the mathematical models have required run-time system behavior for the corresponding components, to identify errors in the formal interface specifications and the formal design specifications, and to feedback the errors into at least one of the informal or formal design specifications;
wherein the verified black box specification generator is arranged to enable user adjustment of the formal interface specifications and the formal design specifications via the input screens to generate corrected mathematical models respectively for the components, to analyze the corrected mathematical models, to identify errors, to feedback the errors until the required run-time system behavior for the corresponding component is achieved, and to derive the verified design specifications from error-free mathematical models.

2. The software design system according to claim 1, the informal system design specifications comprising informal requirement specifications, informal architecture specifications and informal component and specification designs.

3. The software design system according to claim 1, wherein the black box specification generator is arranged to ensure that formal component design specifications are created to be compatible with required run-time interface behavior.

4. The software design system according to claim 1, wherein the black box specification generator is arranged to generate a verified requirements specification, a verified architecture specification, a verified component design specification and a verified component interface specification.

5. The software design system according to claim 1, wherein the model generator is arranged to generate mathematical models in CSP notation.

6. The software design system according to claim 1, wherein the black box specification generator comprises a sequenced-based specification generator for processing the received informal system design specifications to create the formal specifications.

7. The software design system according to claim 6, wherein the sequenced-based specification generator is arranged to output analysis data for user consideration of the design specifications.

8. The software design system according to claim 1, wherein
i) the model generator is arranged to generate mathematical models in CSP notation,
ii) the black box specification generator includes:
a sequenced-based specification generator for processing the received informal system design specifications to create the formal specifications; and
the model verifier including an FDR model checker for checking mathematical models described in CSP notation.

9. The software design system according to claim 1, wherein
i) the model generator is arranged to generate mathematical models in CSP notation,
ii) the black box specification generator includes:
a sequenced-based specification generator for processing the received informal system design specifications to create the formal specifications; and
the model verifier being arranged to feedback specification and design defects to the sequenced-based specification generator such that corrected formal specifications can be created to compensate for the defects, thereby enabling the model generator to create corrected mathematical models.

10. The software design system according to claim 8, wherein model verifier is arranged to feedback specification and design defects to the sequenced-based specification generator such that corrected formal specifications can be created to compensate for the defects, thereby enabling the model generator to create corrected mathematical models.

11. The software design system according to claim 1, further comprising an editor module arranged to enable user editing of the formal and informal specifications via the input screens.

12. The software design system according to claim 11, wherein the editor module is arranged to store data as data files.

13. The software design system according to claim 1, further comprising an automated code generator for creating machine generated program source code from the verified specifications.

14. The software design system according to claim 1, further comprising an automated component test case generator for creating machine generated component test cases from the verified specifications.

15. The software design system according to claim 1, further comprising a verified implementation specification generator for creating verified implementation specifications from the verified specifications.

16. The software design system according to claim 15, wherein the verified implementation specification generator is arranged to process the received verified specifications to create formal implementation specifications; to generate from the formal implementation specifications mathematical models representing run-time implementation behavior of the software design system; to analyse the mathematical models representing the run-time implementation behavior to determine if the mathematical models representing the run-time implementation behavior have required run-time implementation behavior; to adjust the formal implementation specifications until the required run-time implementation behavior is achieved; and to derive required verified component implementation specifications from the mathematical models representing the run-time implementation behavior.

17. The software design system according to claim 16, wherein the system is arranged to process verified requirement specifications, verified architecture specifications and verified component design specifications.

18. The software design system according to claim 17, wherein the verified implementation specification generator is arranged to create formal implementation specifications meeting the verified requirement specifications.

19. The software design system according to claim 18, wherein the verified implementation specification generator is arranged to create the formal interface specifications as fully-specified black-box specifications of the required run-time interface behavior.

20. The software design system according to claim 16, wherein the verified implementation specification generator is arranged compare the verified component implementation specifications against the verified component design specifications and to detect and remove any errors found.

21. The software design system according to claim 16, wherein the verified implementation specification generator is arranged to carry out a box structure development method for creating formal implementation specifications.

22. The software design system according to claim 21, wherein the verified implementation specification generator comprises a model generator for generating the mathematical models representing the run-time implementation behavior of the software design system from the formal implementation specifications.

23. The software design system according to claim 22, wherein the model generator of the verified implementation specification generator is arranged to generate mathematical models in CSP notation.

24. The software design system according to claim 16, wherein the implementation specification generator comprises a model verifier for analysing the mathematical models representing the run-time implementation behavior to determine if the mathematical models representing the run-time implementation behavior have the required run-time implementation behavior.

25. The software design system according to claim 21, wherein the implementation specification generator comprises a model verifier for analysing the mathematical models representing the run-time implementation behavior to determine if the mathematical models representing the run-time implementation behavior have the required run-time implementation behavior and the model verifier of the implementation specification generator comprises an FDR model checker for checking mathematical models described in CSP notation.

26. The software design system according to claim 21, wherein the implementation specification generator comprises a model verifier for analysing the mathematical models representing the run-time implementation behavior to determine if the mathematical models representing the run-time implementation behavior have the required run-time implementation behavior and the model verifier of the implementation specification generator is arranged to feedback specification and design defects to the verified implementation specification generator implementing the box-structured development method, such that corrected formal specifications can be created to compensate for the defects, thereby enabling the model generator of the implementation specification generator to create corrected mathematical models.

27. The software design system according to claim 16, further comprising an editor module arranged to enable user editing of the formal implementation specifications.

28. The software design system according to claim 27, wherein the editor module is arranged to store data as data files.

29. The software design system according to claim 1 further comprising an interface protocol verifier generator for creating machine generated interface protocol verifiers from the verified specifications.

30. The system according to claim 11, wherein the editor module is arranged to generate the input screens, each of the screens including a name of an interface, a unique identifier for each stimulus and response belonging to the interface, a list of input stimuli, and a list of responses.

31. The system according to claim 11, wherein the editor module is arranged to present enumeration tables which are each divided into sections, the sections including a section for a Canonical Sequence which results from the sequence-based specification.

32. The system according to claim 14, wherein the automated test case generator comprises:
    a test sequence generator arranged to generate a set of test cases in the form of sequences of input stimuli with expected responses;
    a test program generator which generates test programs corresponding to each of the test cases; and a test oracle which takes data files, generated by the test programs, that record the results of the test and is arranged to analyze the results to determine whether the test succeeded.

33. The system of claim 1, wherein the under-specified black box specification is achieved by introducing overlapping predicates to capture for a given stimulus a plurality of possible responses and subsequent behavior.

34. An analytical software design system arranged to receive informal system design specifications of a software system and to convert them into verified design specifications for use in creating source code and carrying out implementation testing of the source code, the software design system being arranged to handle informal system design specifications comprising informal requirement specifications, informal architecture specifications and informal component and specification designs, the software design system comprising:
  a verified black box specification generator including a processor to:
  process the received informal system design specifications;
  for each component of the software system, create a formal design specification representative of a fully-specified black box function;
  create formal interface specifications of required run-time interface behavior of each of the components that is visible by its interfaces, the formal interface specifications being created as under-specified black-box specifications of the required run-time interface behavior which captures non-deterministic behavior present at the respective interfaces of the each component with all other components with which the component interacts;
  generate from the formal design specifications and the formal interface specifications, for each of the components, a mathematical model representing run-time system behavior for the component with all other components with which the component interacts;
  analyse the mathematical models to determine if the mathematical models have required run-time system behavior;
  adjust at least one of the formal design specifications or the formal interface specifications until the required run-time system behavior is achieved; and
  derive the verified design specifications from the mathematical models.

35. The software design system according to claim 34, wherein the black box specification generator comprises a sequenced-based specification generator for processing the received informal system design specifications to create the formal design specifications and the formal interface specification.

36. The software design system according to claim 35, wherein the sequenced-based specification generator is arranged to output analysis data for user consideration of the formal interface specifications and the formal design specifications.

37. The software design system according to claim 34, wherein the black box specification generator comprises a model verifier for analysing the mathematical models to determine if the mathematical models have the required run-time system behavior.

38. The system of claim 34, wherein the under-specified black box specifications are achieved by introducing overlapping predicates to capture for a given stimulus a plurality of possible responses and subsequent behavior.

39. An analytical software design system arranged to receive informal system design specifications of a software system and to convert the informal system design specifications into verified design specifications for use in creating source code and carrying out implementation testing of the source code, the software design system comprising:
  a verified black box specification generator arranged to:
    process the received informal system design specifications and for each component of the software system to create formal specifications representative of a fully-specified black box function;
    generate from the formal specifications mathematical models representing run-time system behavior of the software system;
    analyse the mathematical models to determine if the mathematical models have required run-time system behavior;
    adjust the formal specifications until the required run-time system behavior is achieved; and
    derive verified design specifications from the mathematical models; and
  a verified implementation specification generator for creating verified implementation specifications from the verified specifications, the verified implementation specification generator being arranged to:
    process the received verified specifications to create formal implementation specifications;
    generate from the formal implementation specifications, for each of the components, a mathematical model representing run-time implementation behavior for the component with all other components with which the component interacts;
    analyse the mathematical models representing the run-time implementation behavior to determine if the mathematical models representing the run-time implementation behavior have required run-time implementation behavior;
    adjust the formal implementation specifications until the required run-time implementation behavior is achieved; and
    derive the verified implementation specifications from the mathematical models representing the run-time implementation behavior,
  wherein at least one of the verified black box specification generator and the verified implementation specification generator includes a processor.

40. The system as claimed in claim 39 further comprising:
  creating formal interface specifications of a required functional run-time behaviour of each component that is visible by its interfaces, the formal interface specifications being created as under-specified black-box specifications of the required functional run-time behaviour which captures non-deterministic behaviour present at the respective interface of the each component with all other components with which the component interacts.

41. The system of claim 40, wherein the under-specified black box specifications are achieved by introducing overlapping predicates to capture for a given stimulus a plurality of possible responses and subsequent behavior.

42. A method of carrying out analytical software design by receiving informal system design specifications of a software system and converting the informal system design specifications into verified design specifications for use in creating source code and carrying out implementation testing of the source code, the method comprising:

processing the received informal system design specifications and for each component of the software system creating formal design specifications representative of a fully-specified black box function;

creating formal interface specifications of required run-time interface behavior of each of the components that is visible by its interfaces, the formal interface specifications being created as under-specified black-box specifications of the required run-time interface behavior which captures non-deterministic behavior present at the respective interfaces of the each component with all other components with which the component interacts;

generating from the formal design specifications and the formal interface specifications, for each of the components, a mathematical model representing run-time system behavior for the component with all other components with which the component interacts;

analysing the mathematical models to determine if the mathematical models have required run-time system behavior;

adjusting at least one of the formal design specifications or the formal interface specifications until the required run-time system behavior is achieved; and deriving the verified design specifications from the mathematical models, wherein at least one of the processing, the creating, the generating, the analyzing, the adjusting and the deriving is by a processor.

43. The method of claim 42, wherein the under-specified black box specifications are achieved by introducing overlapping predicates to capture for a given stimulus a plurality of possible responses and subsequent behavior.

44. A non-transitory data carrier having stored thereon a program for a computer for configuring the computer to implement a method of carrying out analytical software design by receiving informal system design specifications of a software system and converting the informal system design specifications into verified design specifications for use in creating source code and carrying out implementation testing of the source code, the method comprising:

processing the received informal system design specifications and for each component of the software system creating formal design specifications representative of a fully-specified black box function;

creating formal interface specifications of required run-time interface behavior of each of the components that is visible by its interfaces, the formal interface specifications being created as under-specified black-box specifications of the required run-time interface behavior which captures non-deterministic behavior present at the respective interfaces of the each component with all other components with which the component interacts;

generating, from the formal design specifications and the formal interface specifications, for each of the components, a mathematical model representing run-time system behavior for the component with all other components with which the component interacts;

analysing the mathematical models to determine if the mathematical models have required run-time system behavior;

adjusting at least one of the formal design specifications or the formal interface specifications until the required run-time system behavior is achieved; and deriving the verified design specifications from the mathematical models.

45. The non-transitory data carrier of claim 44, wherein the under-specified black box specifications are achieved by introducing overlapping predicates to capture for a given stimulus a plurality of possible responses and subsequent behavior.

* * * * *